United States Patent
Pan et al.

(10) Patent No.: US 10,798,754 B2
(45) Date of Patent: Oct. 6, 2020

(54) METHOD AND APPARATUS FOR SERVING QUALITY OF SERVICE (QOS) FLOW IN A WIRELESS COMMUNICATION SYSTEM

(71) Applicant: ASUSTek Computer Inc., Taipei (TW)

(72) Inventors: Li-Te Pan, Taipei (TW); Richard Lee-Chee Kuo, Taipei (TW)

(73) Assignee: ASUSTek Computer Inc., Taipei (TW)

(*) Notice: Subject to any disclaimer, the term of this patent is extended or adjusted under 35 U.S.C. 154(b) by 0 days.

(21) Appl. No.: 16/043,818

(22) Filed: Jul. 24, 2018

(65) Prior Publication Data

US 2019/0029057 A1    Jan. 24, 2019

Related U.S. Application Data

(60) Provisional application No. 62/536,163, filed on Jul. 24, 2017.

(51) Int. Cl.
*H04W 76/10* (2018.01)
*H04L 12/24* (2006.01)
(Continued)

(52) U.S. Cl.
CPC ......... *H04W 76/10* (2018.02); *H04L 41/5019* (2013.01); *H04W 28/0268* (2013.01); *H04W 28/12* (2013.01); *H04W 76/00* (2013.01)

(58) Field of Classification Search
CPC . H04W 28/00; H04W 28/02; H04W 28/0268; H04W 28/10; H04W 28/12;
(Continued)

(56) References Cited

U.S. PATENT DOCUMENTS 10,492,096 B2 * 11/2019 Lee ................ H04L 47/2408
2018/0146398 A1 * 5/2018 Kim ................ H04W 72/0406
(Continued)

FOREIGN PATENT DOCUMENTS

| CN | 107637123 | 1/2018 |
|---|---|---|
| WO | 2018026169 | 2/2018 |
| WO | 2018031081 | 2/2018 |

OTHER PUBLICATIONS

Convida Wireless: "SDAP Header Format", 3GPP Draft; R2-1707351 (SDAP Header Format), 3rd Generation Partnership Project (3GPP), Mobile Competence Centre; 650; Route Des Lucioles; F-06921 Sophia-Antipolis Cedex; France, vol. RAN WG2, No. Quingdao, China; Jun. 2, 2017-Jun. 29, 2017 Jun. 26, 2017 (Jun. 26, 2017), XP051301839, Retrieved from the Internet: URL: http://www.3gpp.org/ftp/.
(Continued)

*Primary Examiner* — Tri H Phan
(74) *Attorney, Agent, or Firm* — Blue Capital Law Firm, P.C.

(57) ABSTRACT

A method and apparatus are disclosed from the perspective of a network node. In one embodiment, the method includes the network node transmitting a first message with a DRB (Data Radio Bearer) configuration to a UE (User Equipment) for establishing a default DRB for a PDU (Packet Data Unit) session, wherein the DRB configuration includes a QFI (QoS Flow Id) configuration used to indicate whether a QFI field is present or not in uplink for the default DRB and the QFI configuration is always set to a value indicating the QFI field is present in uplink for the default DRB. The method further includes the network node establishing the default DRB with a presence of the QFI field in uplink. The method also includes the network node receiving a SDAP (Service Data Adaptation Protocol) PDU with the QFI field via the default DRB from the UE.

10 Claims, 12 Drawing Sheets

(51) Int. Cl.
*H04W 76/00* (2018.01)
*H04W 28/12* (2009.01)
*H04W 28/02* (2009.01)

(58) Field of Classification Search
CPC ..... H04W 28/16; H04W 28/24; H04W 76/00; H04W 76/10; H04W 76/11; H04L 12/24; H04L 41/50; H04L 41/5003; H04L 41/5006; H04L 41/5009; H04L 41/5019; H04L 47/2425
See application file for complete search history.

(56) References Cited

U.S. PATENT DOCUMENTS

| | | | | |
|---|---|---|---|---|
| 2019/0028920 | A1* | 1/2019 | Pan | H04W 28/0268 |
| 2019/0029057 | A1* | 1/2019 | Pan | H04W 28/12 |
| 2019/0150023 | A1* | 5/2019 | Cho | H04W 28/02 |
| 2019/0357093 | A1* | 11/2019 | Xu | H04W 36/0058 |
| 2020/0037197 | A1* | 1/2020 | Cho | H04W 80/08 |
| 2020/0084003 | A1* | 3/2020 | Sun | H04W 28/065 |
| 2020/0100136 | A1* | 3/2020 | Chang | H04W 28/0252 |
| 2020/0128430 | A1* | 4/2020 | Yi | H04W 28/0268 |

OTHER PUBLICATIONS

ZTE: "Discussion on the SDAP PDU forme", 3GPP Draft; R2-1704649 Discussion on the SDAP PDU Format, 3rd Generation Partnership Project (3GPP), Mobile Competence Centre; 650 , Route Des Lucioles; F-06921 Sophia-Antipolis Cedex; France vol. RAN WG2, No. Hangzhou, China; May 15, 2017-May 19, 2017 May 14, 2017 (May 14, 2017), XP051275194, Retrieved from the Internet: URL: http://www.3gpp.org/ftp/.

ZTE: "Discussion on reflective QoS", 3GPP Draft;R2-1706668 Discussion on Refelective QOS, 3RD Generation Partnership Project (3GPP), Mobile Competence Centre; 650, Route Des Lucioles; F06921 Sophia-Antipolis Cedex, France, vol. Ran WG2, No. Quingdao, China; Jun. 27, 2017-Jun. 29, 2017 Jun. 26, 2017 (Jun. 26, 2017), XP051301168, Retrieved from the Internet: URL: http://www.3gpp.org/ftp/.

"3rd Generation Partnership Project; Technical Specification Group Radio Access Network; NR; NR and NG-RAN Overall Description Stage 2 (Release 15)" 3GPP Draft; R2-1706540 38300-050, 3rd Generation Partnership Project (3GPP), Mobile Competence Centre; 650 Route Des Lucioles; F-06921 Sophia-Antipolis Cedex; France Jun. 17, 2017 (Jun. 17, 2017), XP051307045, Retrieved from the Internet: URL: http://www.3gpp.org/ftp/tsg_ran/.

Huawei et al: "SDAP Header Format", 3GPP Draft; R2-1706782 SDAP Header Format, 3RD Generation Partnership Project (3GPP), Mobile Competence Centre; 650, Route Des Lucioles; F-06921 Sophia-Antipolis Cedex; France vol. RAN WG2, No. Quingdao, China; Jun. 27, 2017-Jun. 29, 2017 Jun. 26, 2017 (Jun. 26, 2017), XP051301281, Retrieved from the Internet: URL: http://www.3gpp.org/ftp/.

European Search Report from corresponding EP Application No. 18185097.5, dated Dec. 6, 2018.

SDAP Header Format, Convida Wireless, 3GPP TSG-RAN WG2 NR Ad Hoc, R2-1707351, 2017, Jun. 27-29, 2017.

Office Action from SIPO in corresponding CN Application No. 201810820169, dated Mar. 3, 2020.

* cited by examiner

METHOD AND APPARATUS FOR SERVING QUALITY OF SERVICE (QOS) FLOW IN A WIRELESS COMMUNICATION SYSTEM

CROSS-REFERENCE TO RELATED APPLICATIONS

The present Application claims the benefit of U.S. Provisional Patent Application Ser. No. 62/536,163 filed on Jul. 24, 2017, the entire disclosure of which is incorporated herein in their entirety by reference.

FIELD

This disclosure generally relates to wireless communication networks, and more particularly, to a method and apparatus for serving QOS flow in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a network node. In one embodiment, the method includes the network node transmitting a first message with a DRB (Data Radio Bearer) configuration to a UE (User Equipment) for establishing a default DRB for a PDU (Packet Data Unit) session, wherein the DRB configuration includes a QFI (QoS Flow Id) configuration used to indicate whether a QFI field is present or not in uplink for the default DRB and the QFI configuration is always set to a value indicating the QFI field is present in uplink for the default DRB. The method further includes the network node establishing the default DRB with a presence of the QFI field in uplink. The method also includes the network node receiving a SDAP (Service Data Adaptation Protocol) PDU with the QFI field via the default DRB from the UE.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including: TS 38.300 v0.4.1, "$N_R$; NR and NG-RAN Overall Description; Stage 2"; TS 23.501 v1.0.0, "System Architecture for the 5G System; Stage 2"; R2-1707159, "SDAP Header Format", Ericsson; R2-1707160, "Reflective QoS and Presence of Flow-ID", Ericsson; R2-1707161, "QoS Flow Remapping Within the Same Cell and in Handover", Ericsson; S2-170065, "Discussion on Reflective QoS activation using C-plane and U-plane", Huawei and HiSilicon; 3GPP RAN2#98 meeting chairman's note; 3GPP RAN2 NR Ad Hoc #2 meeting chairman's note; TS 38.323 v0.0.5, "NR; Packet Data Convergence Protocol (PDCP) specification"; 3GPP email discussion [NR-AH2#08][NR UP] Running TS 37.324 attachment "Draft 37324-010-v1.doc"; R2-1705780, "QoS flow ID in AS Reflective QoS", CMCC; R2-1704648, "Discussion on reflective QoS", ZTE; R2-1704649, "Discussion on the SDAP PDU format", ZTE; TS 23.401 v14.0.0, "General Packet Radio Service (GPRS) enhancements for Evolved Universal Terrestrial Radio Access Network (E-UTRAN) access". The standards and documents listed above are hereby expressly incorporated by reference in their entirety.

Figure 1:
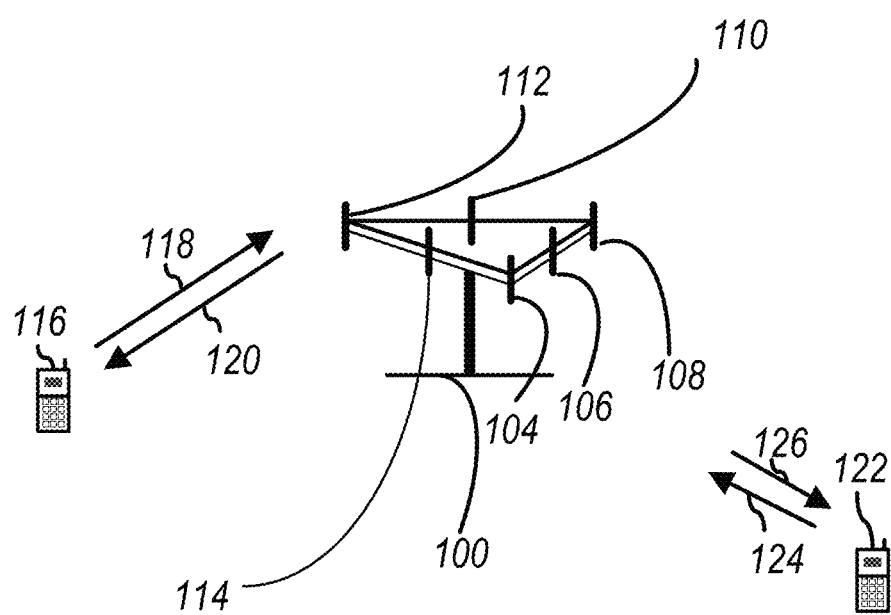
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
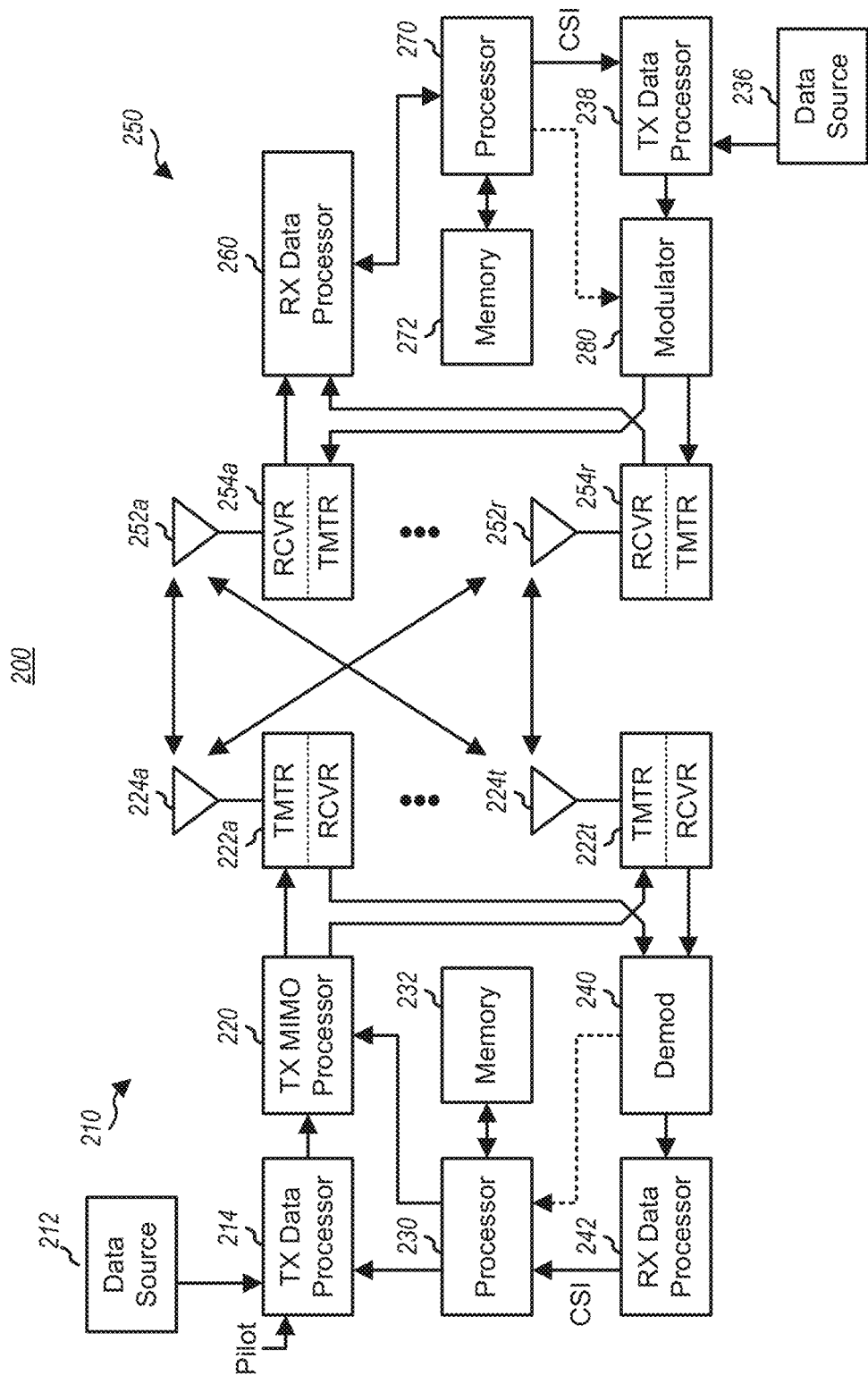
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and down-converts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
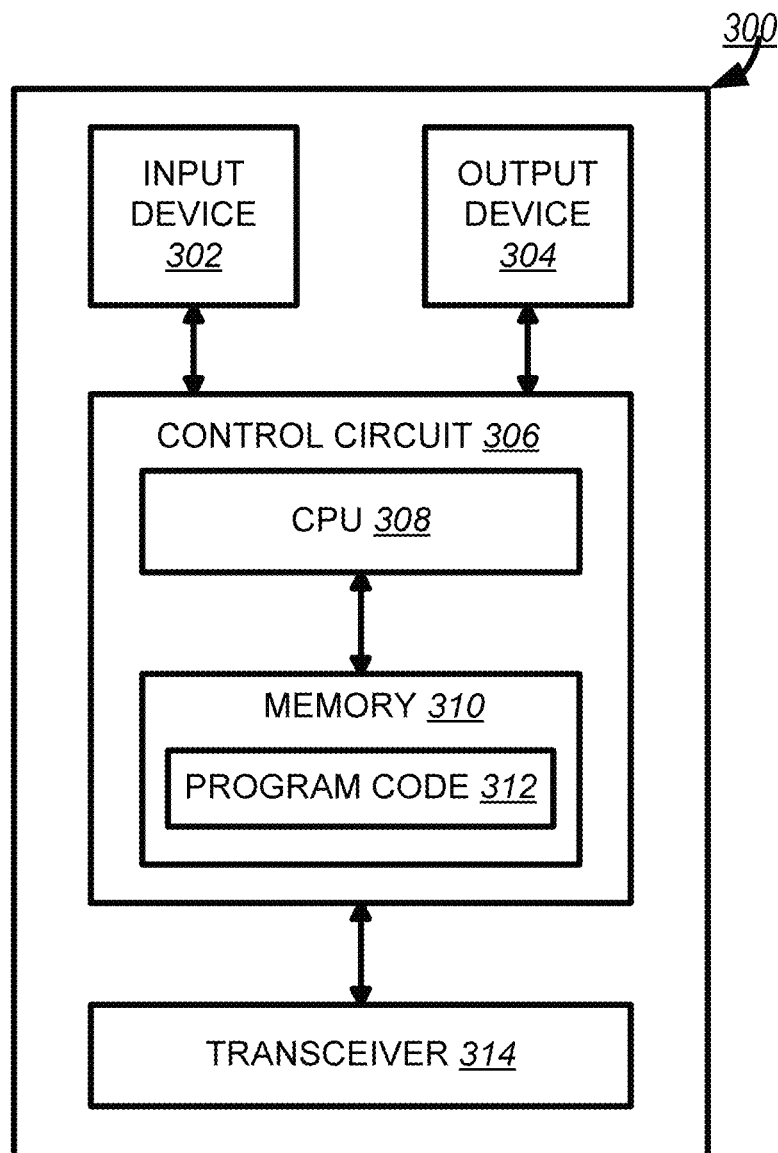
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
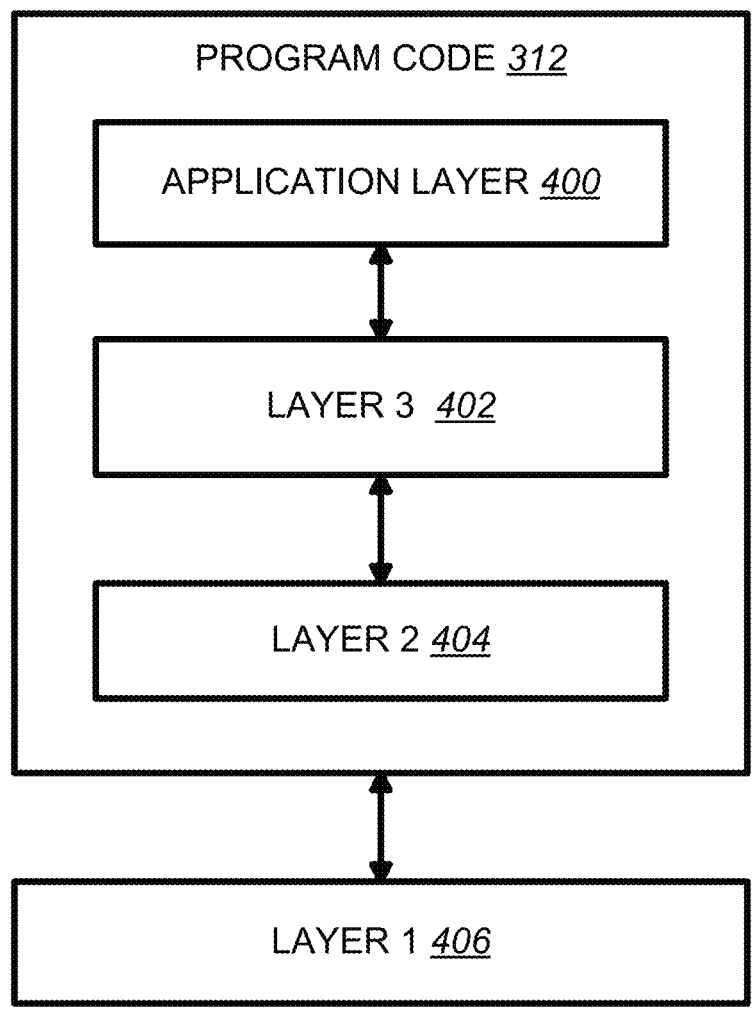
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS38.300 described SDAP (Service Data Adaptation Protocol) layer and QoS as follows:

6.5 SDAP Sublayer

The main services and functions of SDAP include:

Mapping between a QoS flow and a data radio bearer;

Marking QoS flow ID (QFI) in both DL and UL packets.

A single protocol entity of SDAP is configured for each individual PDU session, except for DC where two entities can be configured (one for MCG and another one for SCG—see subclause 12).

[ . . . ]

12 QoS

The QoS architecture in NG-RAN is depicted [in the FIG. 12-1 of 3GPP TS 38.300 v0.4.1, which is reproduced as FIG. 5] and described in the following:

For each UE, 5GC establishes one or more PDU Sessions.

For each UE, the NG-RAN establishes one or more Data Radio Bearers (DRB) per PDU Session. The NG-NG-RAN maps packets belonging to different PDU sessions to different DRBs. Hence, the NG-RAN establishes at least one default DRB for each PDU Session indicated by 5GC upon PDU Session establishment.

NAS level packet filters in the UE and in the 5GC associate UL and DL packets with QoS Flows.

AS-level mapping in the UE and in the NG-RAN associate UL and DL QoS Flows with DRBs.

Figure 5:
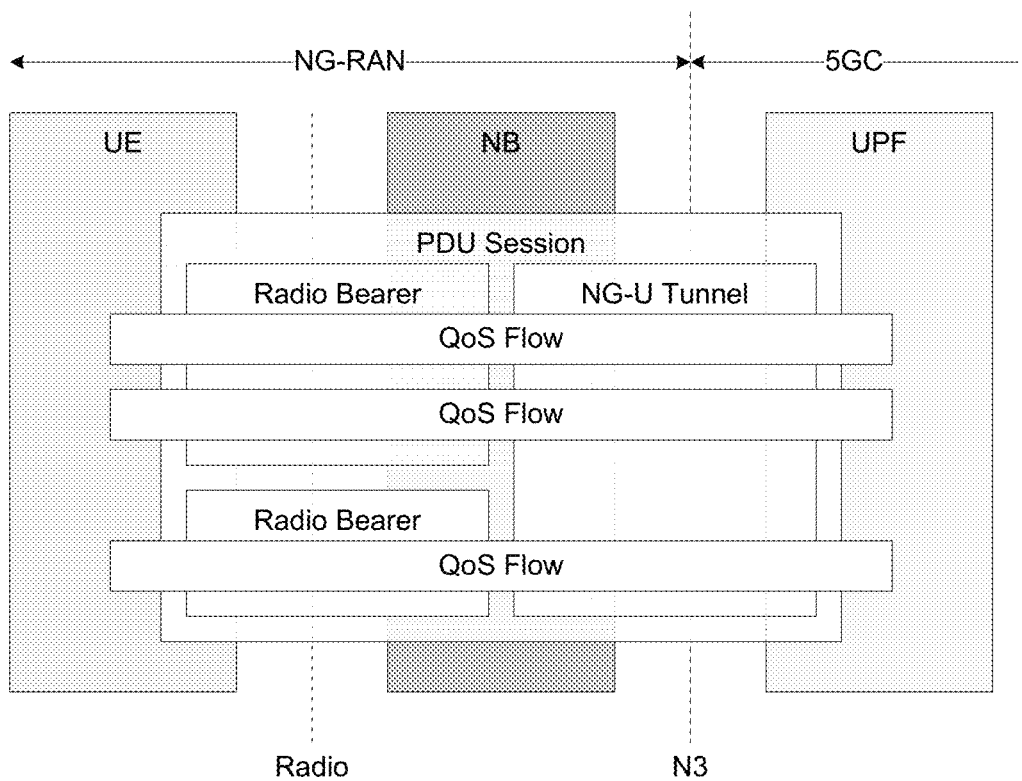
FIG. 5 is a reproduction of FIG. 12-1 of 3GPP TS 38.300 v0.4.1.
Figure 12:
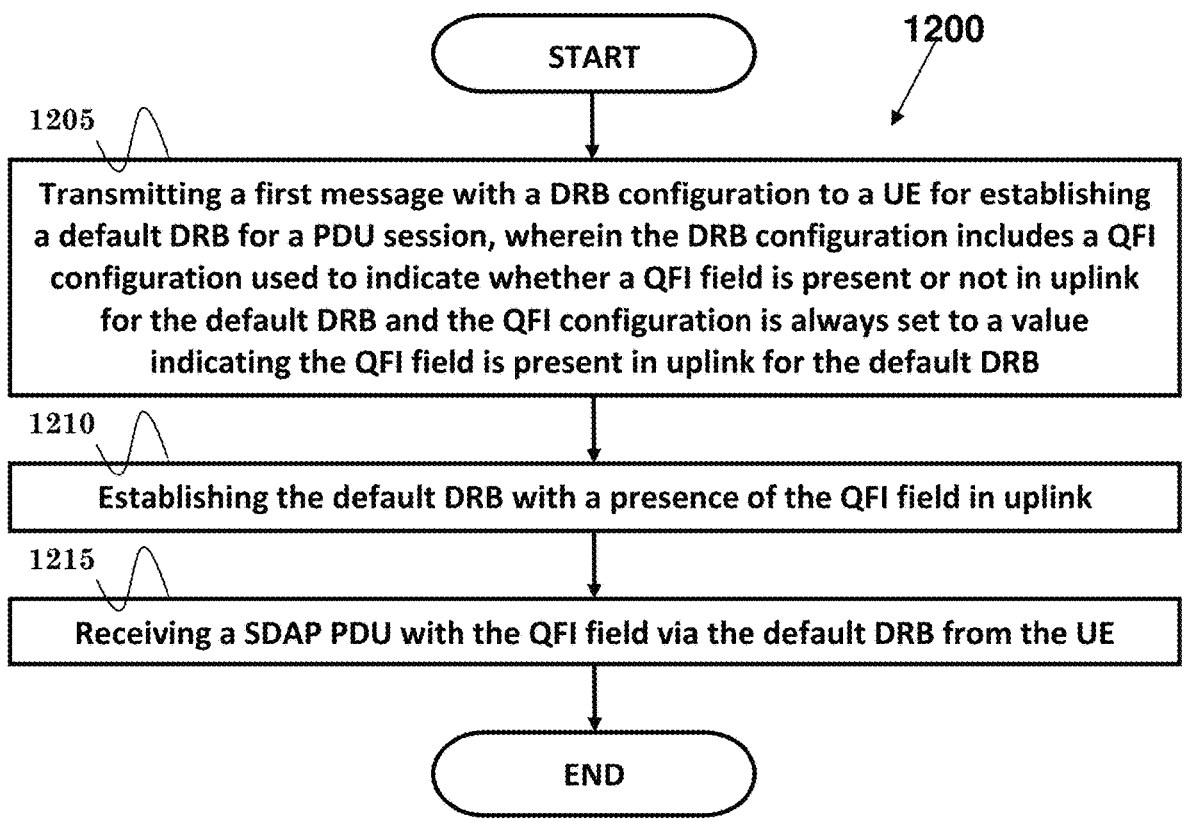
FIG. 12 is a flow chart according to one exemplary embodiment.

[FIG. 12-1 of 3GPP TS 38.300 v0.4.1, entitled "QoS architecture", is reproduced as FIG. 5]

NG-RAN and 5GC ensure quality of service (e.g. reliability and target delay) by mapping packets to appropriate QoS Flows and DRBs. Hence there is a 2-step mapping of IP-flows to QoS flows (NAS) and from QoS flows to DRBs (Access Stratum).

In NG-RAN, the data radio bearer (DRB) defines the packet treatment on the radio interface (Uu). A DRB serves packets with the same packet forwarding treatment. Separate DRBs may be established for QoS flows requiring different packet forwarding treatment. In the downlink, the NG-RAN maps QoS Flows to DRBs based on NG-U marking (QoS Flow ID) and the associated QoS profiles. In the uplink, the UE marks uplink packets over Uu with the QFI for the purposes of marking forwarded packets to the CN.

In the uplink, the NG-RAN may control the mapping of QoS Flows to DRB in two different ways:

Reflective mapping: for each DRB, the UE monitors the QFI(s) of the downlink packets and applies the same mapping in the uplink; that is, for a DRB, the UE maps the uplink packets belonging to the QoS flows(s) corresponding to the QFI(s) and PDU Session observed in the downlink packets for that DRB. To enable this reflective mapping, the NG-RAN marks downlink packets over Uu with QFI.

It is FFS whether the marking with a QFI can be semi-statically configured (to not include the QOS flow ID when not needed).

Explicit Configuration: besides the reflective mapping, the NG-RAN may configure by RRC an uplink "QoS Flow to DRB mapping".

The precedence of the RRC configured mapping and reflective QoS is FFS (can reflective QoS update and thereby override an RRC configured mapping? Or does a configured QoS Flow ID to DRB mapping always take precedence over a reflective mapping?)

If an incoming UL packet matches neither an RRC configured nor a reflective "QoS Flow ID to DRB mapping", the UE shall map that packet to the default DRB of the PDU session.

Within each PDU session, is up to NG-RAN how to map multiple QoS flows to a DRB. The NG-RAN may map a GBR flow and a non-GBR flow, or more than one GBR flow to the same DRB, but mechanisms to optimise these cases are not within the scope of standardization. The timing of establishing non-default DRB(s) between NG-RAN and UE for QoS flow configured during establishing a PDU session can be different from the time when the PDU session is established. It is up to NG-RAN when non-default DRBs are established.

In DC, the QoS flows belonging to the same PDU session can be mapped to different bearer types (see subclause 4.5.2) and as a result there can be two different SDAP entities configured for the same PDU session: one for MCG and another one for SCG (for instance when one MCG bearer and one SCG bearer are used for two different QoS flows).

The support for PDU session mapped to different bearers is pending conclusions in SA2 and RAN3.

[ . . . ]

Annex A (Informative):

QoS Handling in RAN

When and if to include the QFI in full or in shortened form and RQI in SDAP is FFS.

All message names and parameters are FFS.

These reflect current status and may need to be updated based on further decisions.

[ . . . ]

A.6 UE Initiated UL QoS Flow

The following figure shows an example message flow when the UE AS receives an UL packet for a new QoS flow for which a QFI for DRB does not exist.

Figure 6:
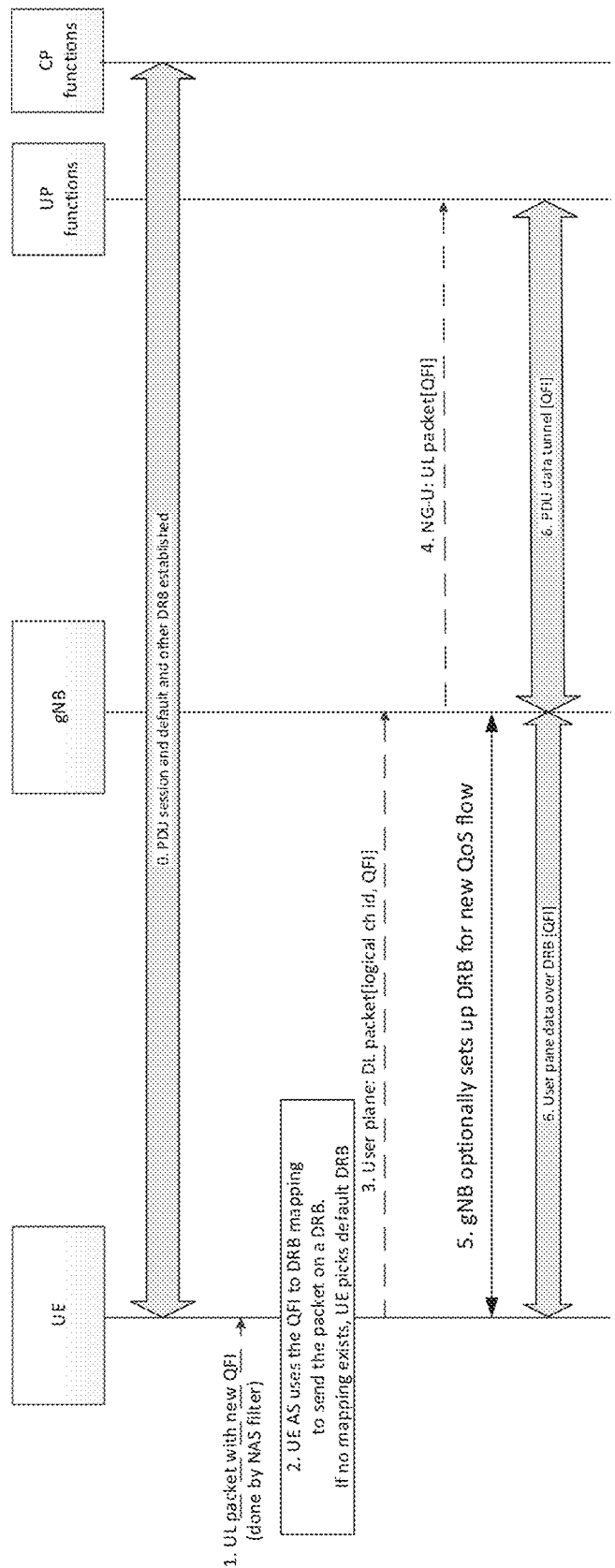
FIG. 6 is a reproduction of FIG. A.6-1 of 3GPP TS 38.300 v0.4.1.

[FIG. A.6-1 of 3GPP TS 38.300 v0.4.1, entitled "UL packet with a new QoS flow for which a mapping does not exist in UE", is reproduced as FIG. 6]

0. PDU session and DRBs (including a default DRB) have been already established.
1. UE AS receives a packet with a new QFI from UE NAS.
2. UE uses the QFI of the packet to map it to a DRB. If there is no mapping of the QFI to a DRB in the AS mapping table for this PDU session, then the packet is assigned to the default DRB.
3. UE sends the packet on the default DRB. The UE includes the QFI in the SDAP header if SDAP has been configured for this DRB.
4. gNB sends UL packets over NG-U and includes the corresponding QFI.
5. If gNB wants to use a new DRB for this QoS flow, it sets up a DRB. It can also choose to move the QoS flow to an existing DRB using RRC signalling or AS reflective mapping procedures discussed above. Details of this are as shown in Figure X.2-1 and Figure X.3-1 [of 3GPP TS 38.300 v0.4.1].
6. UL packets received in UE AS with the QFI are sent over the DRB decided by the QFI to DRB mapping table. If configured in step 5, UL data packets include a QoS marking (same as or corresponding to QFI) in the SDAP header.

3GPP TS 23.501 specified QoS model for NR (New RAT/Radio) as follows:

5.7 QoS Model 5.7.1 General Overview

The 5G QoS model supports a QoS flow based framework. The 5G QoS model supports both QoS flows that require guaranteed flow bit rate and QoS flows that do not require guaranteed flow bit rate. The 5G QoS model also supports reflective QoS (see clause 5.7.5).

The QoS flow is the finest granularity of QoS differentiation in the PDU session. A QoS Flow ID (QFI) is used to identify a QoS flow in the 5G system. User Plane traffic with the same QFI within a PDU session receives the same traffic forwarding treatment (e.g. scheduling, admission threshold). The QFI is carried in an encapsulation header on N3 (and N9) i.e. without any changes to the e2e packet header. It can be applied to PDUs with different types of payload, i.e. IP packets, unstructured PDUs and Ethernet frames. The QFI shall be unique within a PDU session.

NOTE 1: Policing of User Plane traffic (e.g. MFBR enforcement) is not regarded as QoS differentiation and is done by UPFs on an SDF level granularity.

Each QoS flow (GBR and Non-GBR) is associated with the following QoS parameters (parameter details are described in clause 5.7.2):

5G QoS Indicator (5QI).

Allocation and Retention Priority (ARP).

Each GBR QoS flow is in addition associated with the following QoS parameters (details are described in clause 5.7.2):

Guaranteed Flow Bit Rate (GFBR)—UL and DL;

Maximum Flow Bit Rate (MFBR)—UL and DL;

Notification control.

Each Non-GBR QoS flow may in addition be associated with the following QoS parameter (details are described in clause 5.7.2):

Reflective QoS Attribute (RQA).

Two ways to control QoS flows are supported:

1) For non-GBR QoS flows with standardized 5QIs, the 5QI value is used as QFI as defined in clause 5.7.4 and a default ARP is used. In this case no additional N2 signalling is required at the time traffic for the corresponding QoS flows start; or 2) For GBR and non-GBR QoS flows, all the necessary QoS Parameters corresponding to a QFI are sent as QoS profile to (R)AN, UPF either at PDU Session establishment or QoS flow establishment/modification.

Editor's note: Whether beyond the standardized 5QIs, also pre-configured 5QI values can be further used as QFI values is FFS.

The QoS parameters of a QoS flow are provided to the (R)AN as a QoS profile over N2 at PDU Session or at QoS flow establishment and when NG-RAN is used at every time the User Plane is activated. QoS parameters may also be pre-configured in the (R)AN for non-GBR QoS flows (i.e. without the need to be signalled over N2).

The UE performs the classification and marking of UL User plane traffic, i.e. the association of uplink traffic to QoS flows, based on QoS rules. These rules may be explicitly signaled over N1 (at PDU Session establishment or QoS flow establishment), pre-configured in the UE or implicitly derived by UE from reflective QoS. A QoS rule contains a QoS rule identifier, the QFI of the QoS flow, one or more packet filters and a precedence value. There can be more than one QoS rule associated with the same QFI (i.e. with the same QoS flow).

A default QoS rule is required for every PDU session. The default QoS rule is the only QoS rule of a PDU session that may contain no packet filter (in this case, the highest precedence value (i.e. lowest priority) has to be used). If the default QoS rule does not contain a packet filter, the default QoS rule defines the treatment of packets that do not match any other QoS rule in a PDU session.

Editor's note: It is FFS whether there, in addition, is a need for pre-authorized QoS rules be provided to the UE.

The SMF allocates the QFI for every QoS flow and derives its QoS parameters from the information provided by the PCF. When applicable, the SMF provides the QFI together with the QoS profile containing the QoS parameters of a QoS flow to the (R)AN. The SMF provides the SDF template (i.e. the set of packet filters associated with the SDF received from the PCF) together with the SDF precedence and the corresponding QFI to the UPF enabling classification and marking of User Plane traffic. When applicable, the SMF generates the QoS rule(s) for the PDU Session by allocating QoS rule identifiers, adding the QFI of the QoS flow, setting the packet filter(s) to the UL part of the SDF template and setting the QoS rule precedence to the SDF precedence. The QoS rules are then provided to the UE enabling classification and marking of UL User Plane traffic.

Editor's note: Some applications, e.g. IMS, require also the DL part of the SDF template in the QoS rule. Whether the DL of the SDF template has to be sent for every QoS rule is FFS.

Figure 7:
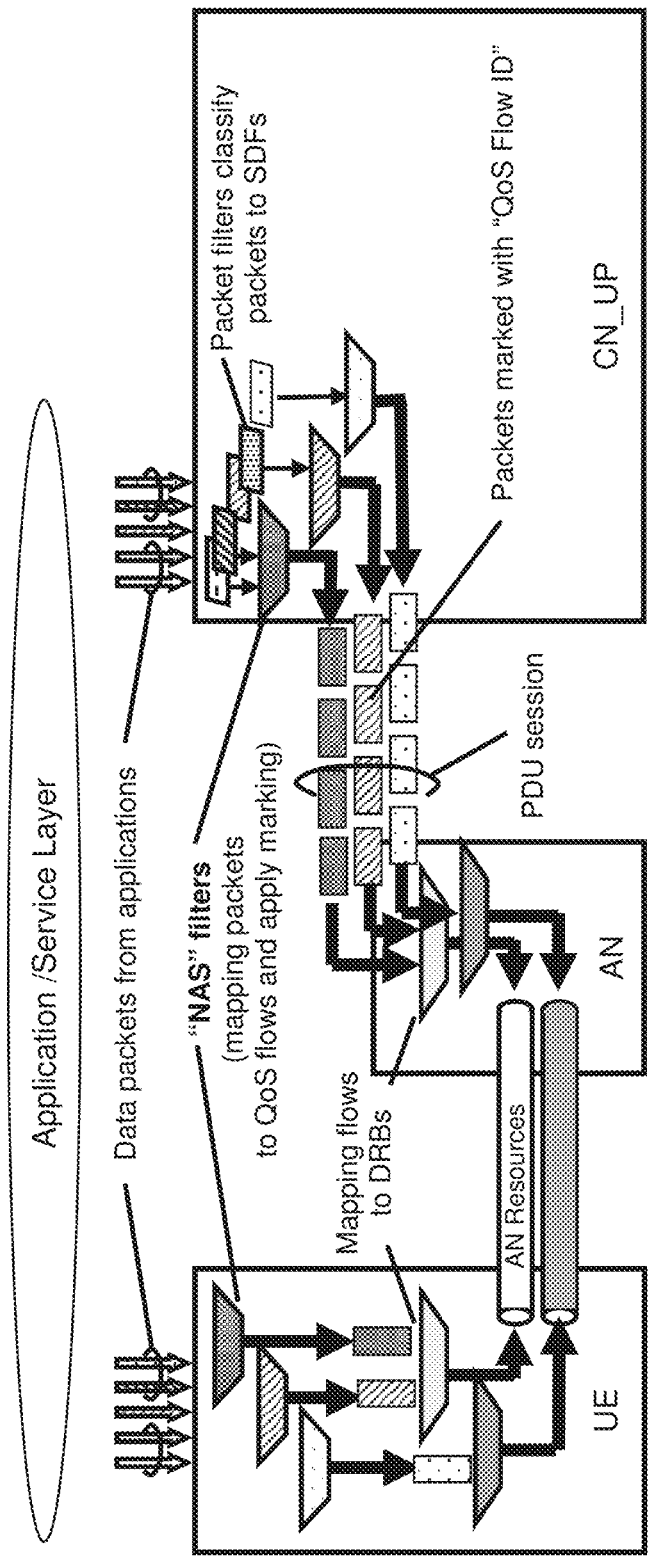
FIG. 7 is a reproduction of FIG. 5.7.1-1 of TS 23.501 v1.0.0.

The principle for classification and marking of User Plane traffic and mapping of QoS Flows to AN resources is illustrated in FIG. 5.7.1-1 [of 3GPP TS 23.501 V1.0.0, which is reproduced as FIG. 7].

[FIG. 5.7.1-1 of TS 23.501 v1.0.0, entitled "The principle for classification and User Plane marking for QoS Flows and mapping to AN Resources", is reproduced as FIG. 7]

In DL incoming data packets are classified based on SDF templates according to their SDF precedence (without initiating additional N4 signalling). The CN conveys the classification of the User Plane traffic belonging to a QoS flow through an N3 (and N9) User Plane marking using a QFI. The AN binds QoS flows to AN resources (i.e. Data Radio Bearers in case of in case of 3GPP RAN). There is no strict 1:1 relation between QoS flows and AN resources. It is up to the AN to establish the necessary AN resources to map the QoS flows to DRBs so that the UE receives the QFI (and reflective QoS (see clause 5.7.5) may be applied).

In UL, the UE evaluates UL packets against the packet filters in the QoS rules based on the precedence value of QoS rules in increasing order until a matching QoS rule (i.e. whose packet filter matches the UL packet) is found. The UE uses the QFI in the corresponding matching QoS rule to bind the UL packet to a QoS Flow. The UE then binds QoS flows to AN resources.

If no match is found and the default QoS rule contains one or more uplink packet filters, the UE shall discard the uplink data packet.

The following characteristics apply for processing of Downlink traffic:

UPF maps User Plane traffic to QoS flows based on the SDF templates

UPF performs Session-AMBR enforcement and also performs PDU counting for support of charging.

UPF transmits the PDUs of the PDU session in a single tunnel between 5GC and (R)AN, the UPF includes the QFI in the encapsulation header. In addition, UPF may include an indication for reflective QoS activation in the encapsulation header.

UPF performs transport level packet marking in downlink, e.g. setting the DiffServ Code point in outer IP header. Transport level packet marking may be based on the 5QI and ARP of the associated QoS flow.

(R)AN maps PDUs from QoS flows to access-specific resources based on the QFI and the associated 5G QoS characteristics and parameters, also taking into account the N3 tunnel associated with the downlink packet.

NOTE 2: Packet filters are not used for binding of QoS flows onto access-specific resources in (R)AN.

If reflective QoS applies, the UE creates a new derived QoS rule. The packet filter in the derived QoS rule is derived from the (i.e. the header of the) DL packet, and the QFI of the derived QoS rule is is set according to the QFI of the DL packet.

Following characteristics apply for processing of uplink traffic:

UE uses the stored QoS rules to determine mapping between UL User Plane traffic and QoS flows. UE transmits the UL PDUs using the corresponding access specific resource for the QoS flow based on the mapping provided by RAN.

(R)AN transmits the PDUs over N3 tunnel towards UPF. When passing an UL packet from (R)AN to CN, the (R)AN determines the QFI value, which is included in the encapsulation header of the UL PDU, and selects the N3 tunnel.

(R)AN performs transport level packet marking in the uplink, transport level packet marking may be based on the 5QI and ARP of the associated QoS Flow.

UPF verifies whether QFIs in the UL PDUs are aligned with the QoS Rules provided to the UE or implicitly derived by the UE (e.g. in case of reflective QoS).

UPF performs Session-AMBR enforcement and counting of packets for charging.

For UL Classifier PDU sessions, UL and DL Session-AMBR shall be enforced in the UPF that supports the UL Classifier functionality. In addition, the DL Session-AMBR shall be enforced separately in every UPF that terminates the N6 interface (i.e. without requiring interaction between the UPFs) (see clause 5.6.4).

For multi-homed PDU sessions, UL and DL Session-AMBR shall be enforced in the UPF that supports the Branching Point functionality. In addition, the DL Session-AMBR shall be enforced separately in every UPF that terminates the N6 interface (i.e. without requiring interaction between the UPFs) (see clause 5.6.4).

NOTE 3: The DL Session-AMBR is enforced in every UPF terminating the N6 interface to reduce unnecessary transport of traffic which may be discarded by the UPF performing the UL Classifier/Branching Point functionality due to the amount of the downlink traffic for the PDU session exceeding the DL Session-AMBR.

The (R)AN shall enforce Max BitRate (UE-AMBR) limit in UL and DL per UE for non-GBR QoS flows. The UE shall perform UL rate limitation on PDU Session basis for non-GBR traffic using Session-AMBR, if the UE receives a session-AMBR.

Rate limit enforcement per PDU session applies for flows that do not require guaranteed flow bit rate. MBR per SDF is mandatory for GBR QoS flows but optional for non-GBR QoS flows. The MBR is enforced in the UPF.

The QoS control for Unstructured PDUs is performed at the PDU session level. When a PDU session is set up for transferring unstructured PDUs, SMF provides the QFI which will be applied to any packet of the PDU session to the UPF and UE.

Editor's note: Whether and how the QoS flow level QoS control is supported for unstructured PDUs is FFS.

3GPP R2-1707159 discussed SDAP Header Format as follows:

2.1 Transparent Mode for SDAP

As agreed in the last meeting there are cases when the SDAP header is not needed (e.g. when operating in LTE+DC mode towards EPC or when the network does not intend to use any reflective mapping). When the network does not configure the SDAP header one could model this in a way that the SDAP layer is absent. However, this makes the protocol look different depending on an RRC configuration. Hence, a cleaner solution is to model the absence of the SDAP header as "SDAP transparent mode" as done already in several other 3GPP protocols. In this way, SDAP can always be drawn on top of PDCP. Also a PDCP SDU is always an SDAP PDU.

Proposal 1 When RRC de-configures the SDAP header, this is modelled as SDAP transparent mode.

2.2 SDAP Header Format

In RAN2 97-bis meeting, decision was made to include Flow ID in SDAP header and to have the header byte aligned. Yet, the question of Flow Id length remains open. Possible sizes of flow ID are from 7 bits up to 16 bits when SDAP header is assumed to be one or two bytes and Maximum defined QFI value in QFI table defined by SA is 79 [1]. Flow ID value range with 7-bits should be already sufficient as it allows 128 flows to exist in one PDU session. Having larger Flow ID range requires UE to allocate more resources for Flow to DRB mapping.

TABLE 1

3GPP TS23.501 System Architecture for 5G System, Stage2, V0.4.0 (2017-04)

5.7.5.4.2 Reflective QoS Activation via User Plane
When the 5GC determines to activate reflective QoS via U-plane, the SMF shall include a QoS rule including an indication to the UPF via N4 interface to activate User Plane with user plane reflective. When the UPF receives a DL packet matching the QoS rule that contains an indication to activate reflective QoS, the UPF shall include the RQI in the encapsulation header on N3 reference point. The UE creates a UE derived QoS rule when the UE receives a DL packet with a RQI. (Reflective QoS Indication).

Based on the input from SA2 that UEs shall be told whether a DL packet requires an update of the NAS level SDF-to-Flow mapping. We propose that there is one-bit indication in the DL header. When the bit is set to 1, the UE indicates to NAS that it shall determine and possibly update the SDF-to-Flow mapping based on the Flow-ID present in the SDAP header [2].

Proposal 2 the DL SDAP Header Includes 1-Bit NAS-RQI Indication that Indicates Whether the UE Shall Create (or Update) a UE Derived QoS Rule.

Similarly, to NAS RQI, there could be AS RQI bit indication in SDAP header indicating whether the UE shall create or update a QoS Flow to DRB mapping. Having both, NAS and AS RQI indication would require the SDAP header to be 2-bytes assuming that a 6-bit flow id length is not sufficient.

FIG. 1 shows the header when both, AS and NAS RQI exists in the header. Length of the Flow ID is between 7 and 16.

Figure 8:
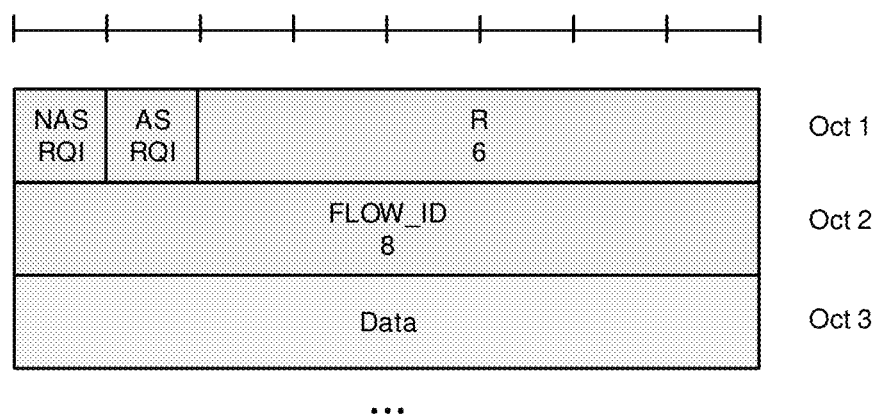
FIG. 8 is reproduction of FIG. 1 of 3GPP R2-1707159.

[FIG. 1 of 3GPP R2-1707159, entitled "DL SDAP header with 8-bit Flow ID, NAS-RQI, AS-RQI and 6-bit Reserved field", is reproduced as FIG. 8]

Observation 1 in DL, when NAS-RQI and AS-RQI Fields are Present and Flow ID is Greater than 7-Bits, SDAP Header Grows to 2 Bytes Having NAS-RQI and AS-RQI allows gNB transmitter to omit the AS Flow ID in downlink header when neither the NAS RQI bit nor the AS RQI bit is set. This would allow reducing the header size to one octet in all DL packets that should not trigger any filter-update. But of course, it would also result in a variable SDAP header size. Such header is presented in the FIG. 1.

Figure 9:
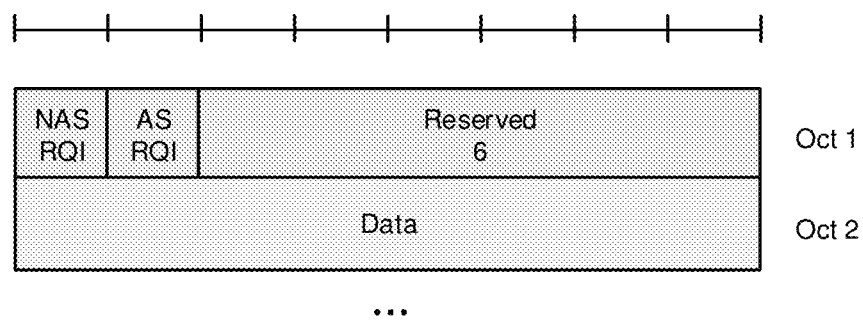
FIG. 9 is reproduction of FIG. 2 of 3GPP R2-1707159.

[FIG. 2 of 3GPP R2-1707159, entitled "DL SDAP header with 1-bit NAS-RQI, 1-bit AS-RQI and Flow ID omitted (AS RQI=0)", is reproduced as FIG. 9]

The header length variation in the SDAP header and adds complexity when e.g. ROHC needs to identify the starting point of the IP packet in the PDCP layer.

Considering that updating the Flow-ID to DRB mapping is significantly easier than the update of the NAS filters, we don't think that such an explicit indication should be added. Without that indication a header length of one byte provides space for a 7-bit Flow ID length.

From DRB to Flow ID mapping perspective in UE, it is not desirable to have longer Flow ID range than required as UE is required to maintain Flow to DRB mapping table. The range of 128 Flow IDs is sufficient for the use cases that currently exists [1].

The resulting downlink SDAP header is depicted in FIG. 3.

Figure 10:
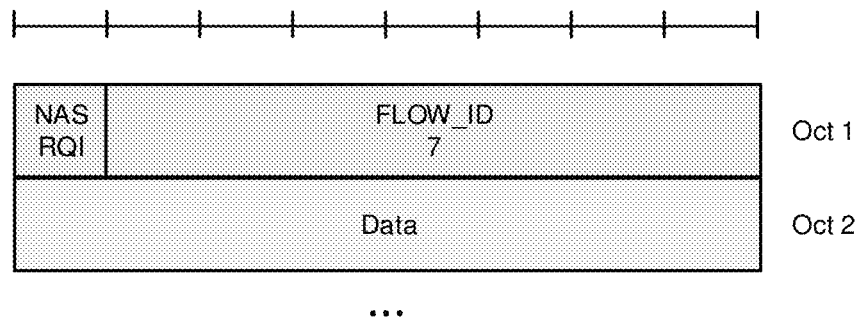
FIG. 10 is reproduction of FIG. 3 of 3GPP R2-1707159.

[FIG. 3 of 3GPP R2-1707159, entitled "DL SDAP header with 7-bit Flow ID and NAS-RQI", is reproduced as FIG. 10]

Proposal 3 the DL and UL SDAP header contains a 7-bit flow ID

For UL, Flow ID provides information to the gNB from which gNB is able to observe the QoS marking carried in the NG3 UL header. The NAS-RQI is not required. Hence the resulting UL header has one spare bit (R) for later use as shown in FIG. 4.

Figure 11:
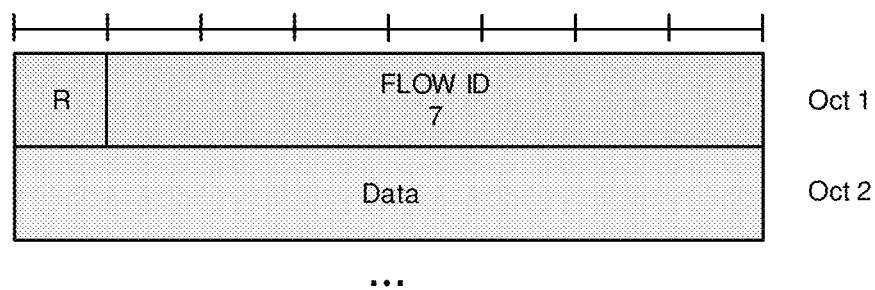
FIG. 11 is reproduction of FIG. 4 of 3GPP R2-1707159.

[FIG. 4 of 3GPP R2-1707159, entitled "UL SDAP header when 7-bit Flow ID is used", is reproduced as FIG. 11]

Proposal 4 The UL SDAP header has one spare bit (R) for later use.

In previous meeting, some companies proposed to have control PDU for SDAP layer. Information carried by the control PDU would be related to the state of NAS and AS usage. This information can carried with the methods proposed above. Furthermore, RRC signalling covers QoS features, which would make control element information redundant. Since SDAP layer is used currently only with QoS and it is currently tightly coupled with the PDCP entity, control PDU would add complexity that may not be justified with the benefits. Additionally, dynamic SDAP header introduces complexity to the ROHC implementation as the position of the IP packet needs to be known by ROCH. Alternatively having SDAP header at the end would avoid the ROCH problems but introduce coupling of SDAP header with PDCP SDU length information. Parsing from the end with dynamic headers would create complexity to the receiver parser as the receiver would need to predict the length of the SDAP header or have it indicated otherwise.

Proposal 5 Control headers are not introduced in SDAP layer.

Proposal 6 SDAP header is placed at the beginning of the PDU.

3GPP R2-1707160 discussed reflective QoS and presence of Flow-ID as follows:

Presence of SDAP header and QoS Flow ID

To enable reflective QoS, the RAN marks downlink packets over Uu with a QoS flow ID. The UE marks uplink packets over Uu with the QoS flow ID for the purposes of marking forwarded packets to the CN.

RAN2-97bis agreed that . . .

DL packets over Uu are not marked with "Flow ID" at least for cases where UL AS reflective mapping and NAS reflective QoS is not configured for DRB.

AS layer header include the UL "Flow ID" depending on network configuration RAN2-98 discussed the topic again and concluded the following:

1. The QoS flow ID is presence once the AS reflective QoS is active. FFS whether it is always present.

2. gNB should be informed when NAS layer reflective QoS is activated (e.g. can be used). It is FFS how we handle NAS reflective QoS and dependent on how/when it will be provided.

3. RAN2 will support a mode in which SDAP header is not present and is configured per DRB. If configured, FFS how the different fields are handled.

Dynamic Presence of QoS Flow ID

Bullet 3 above implies that the eNB configures by RRC for each DRB whether or not the UE shall include the SDAP header in uplink PDCP SDUs and whether the SDAP header is present in DL PDCP SDUs. According to bullet 1, it should be discussed further whether the "QoS flow ID", once SDAP is configured, "is always present" or whether it may be present only dynamically. To achieve the latter the SDAP header would need to indicate with one bit the presence of the "QoS Flow ID". Since such an indication would consume one bit itself it would not allow reducing the size of the SDAP header below one octet. Hence, we consider it more efficient to aim for an SDAP header that has a fixed size of one byte (if configured to be present by RRC).

Proposal 1 If the SDAP is configured for a DRB by means of RRC, the "QoS Flow ID" is present in UL and DL packets on that DRB (not dynamically enabled/disabled).

Re-Configuring Presence of SDAP Header

Since UE and network must be aware at any point in time which PDCP SDUs contain an SDAP header, the presence of this header should only be changed by a synchronized reconfiguration, i.e., RRCConnectionReconfiguration including mobilityControlInfo. One should note that this still requires that the PDCP receiver entity informs the SDAP entity for each delivered PDCP PDU whether the SDAP header is present. If one would like to avoid that, RAN2 should restrict the configuration of SDAP header to full configuration (fullConfig). However, we consider it acceptable to allow enabling/disabling the SDAP header during a handover.

Proposal 2 The eNB may change the presence of the SDAP header only by means of a handover, i.e., a synchronized reconfiguration.

Due to the decision to make SDAP a separate protocol above PDCP, the RoHC compressor and decompressor (which are specified to be part of PDCP) must now peek into the SDAP PDU and work with the SDAP SDU (the IP packet). While this is not a nice design, we believe that with the two proposals above both the UE and the network have all information that is necessary to perform RoHC.

Observation 1 Based on the RRC configuration RoHC compressor and decompressor entities in UE and network side can determine the position of the IP packet inside each PDCP PDU, i.e., whether an SDAP header is present or not.

Conclusion

Based on the discussion in section 2 we propose the following:

Proposal 1 If the SDAP is configured for a DRB by means of RRC, the "QoS Flow ID" is present in UL and DL packets on that DRB (not dynamically enabled/disabled).

Proposal 2 The eNB may change the presence of the SDAP header only by means of a handover, i.e., a synchronized reconfiguration.

References

R2-1707159. SDAP Header Format. Ericsson, RAN2-98-AH, Qingdao, P. R. of China, 27th-29 Jun. 2017

R2-1707161. QoS Flow Remapping Within the Same Cell and in Handover. Ericsson, RAN2-98-AH, Qingdao, P. R. of China, 27th-29 Jun. 2017

Annex: QoS-Related Agreements in Previous Meetings

RAN2-95 discussed the basic principles of the NR QoS framework and reached the following agreements:

Agreements
1 For DL for a non-GBR flow, the eNB sees an indication over NG-u and based on the indication the eNB maps the packet to a DRB of an appropriate QoS. RAN2 understanding of SA2 agreements is that eNB has a QoS profile associated with the indication.
FFS whether there is a requirement for every different QoS indication to be mapped to a different radio bearer.
2 Functionality is required to differentiate flows from different PDN-connections over the radio interface (e.g. by using separate DRBs or by an explicit indication in a header)
3 For DL, the eNB establishes DRBs for the UE taking the QoS profiles in to account.
FFS how the DRB is established in the first packet is an UL packet.

At RAN2-95bis some further agreements were achieved and the first of the FFSs above was resolved:

Agreements
1: RAN determines the mapping relationship between QoS flow (as determine by the UE in UL or marked by the CN in DL) and DRB for UL and DL.
1a RAN can map multiple QoS flows to a DRB.
2 Specification will not forbid a GBR flow and non-GBR flow to be mapped to the same DRB, but we will not introduce mechanisms to optimise this case.
3 Specification will not forbid more than one GBR flow to be mapped to the same DRB, but we will not introduce mechanisms to optimise this case.
FFS: Whether traffic from different PDU sessions can be mapped to one DRB or not.

Agreements
1 Default DRB is established by eNB at PDU session establishment (or an existing DRB may be used if mapping of more than one session to a DRB is allowed)
2. If the first packet of the flow is UL packet, if no mapping rule is configured in the UE, the packet is sent through default DRB to the network.
FFS How and when the network can remap the flow to more appropriate DRB.
FFS the first packet is handled in the case that pre-authorised QoS is configured
FFS whether the pre-authorised QoS applies to RAN or only to the UE.
FFS whether there is a single level of mapping from UL TFT (5 tuple) to DRB, or whether there is a 2 level mapping from UL TFT to QoS flow and then from QoS flow to DRB.

RAN2#96:
Agreement
1: Traffic from different PDU sessions are mapped to different DRBs
2: In DL we have a 2-step mapping of IP flows, in which NAS is responsible for the IPflow→QOSflow mapping, and AS is responsible for the QOSflow→DRB mapping (confirmation of SA2 agreement status).
3: In UL we have a 2-step mapping of IP flows, in which NAS is responsible for the IPflow→QOSflow mapping, and AS is responsible for the QOSflow→DRB mapping.
4 DL packets over Uu are marked in band with QOS-flow-id for the purposes of reflective QoS
5 UL packets over Uu are marked in band with QOS-flow-id for the purposes of marking forwarded packets to the CN.
FFS for bullets 4 and 5 whether it can be semi-statically configured to not include the QOS flow ID in some cases.
FFS for bullets 4 and 5 whether it might be possible to use a shorter id over the radio compared to that received from the CN. This is a stage 3 issue.

Agreements
1 For reflective QoS, the UE determines QoS Flow ID to DRB mapping in the uplink based on the downlink packets received within a DRB and applies those filters for mapping uplink Flows to DRBs.
2 The UE "continuously" monitors the QoS Flow ID in downlink PDCP packets and updates the reflective QoS Flow ID to DRB mapping in the uplink accordingly.
3 RRC can configure an uplink mapping
FFS The precedence of the RRC configured mapping and reflective QoS (e.g. can reflective QoS update an RRC configured mapping)

Working Assumption:
If an incoming UL packet does not match a QoS Flow ID to DRB mapping (neither a configured nor a determined via reflective QoS), the UE shall map that packet to the default DRB of the PDU session.
=>FFS whether the QoS field is added by PDCP or a new protocol layer above PDCP.

RAN2 Ad-Hoc January 2017:
Agreements
1: A new user plane AS protocol layer (e.g. PDAP) above PDCP should be introduced to accommodate all the functions introduced in AS for the new QoS framework, including:
QOS flow→DRB routing;
QoS-flow-id marking in DL packets;
QoS-flow-id marking in UL packets;
2 The new protocol layer is applicable for all cases connecting to the 5G-CN
3: Single protocol entity is configured for each individual PDU session.

RAN2-97 Athens:
1 RAN2 to confirm that the timing of non-default DRB establishment (RAN to UE) for QoS Flow configured during PDU Session Establishment could be done NOT at the same time as PDU Session Establishment. (up to eNB implementation)
2 Working assumption from RAN2#96 is confirmed. i.e. First UL packet that doesn't have a mapping to a DRB, is mapped to a default DRB.
1 "Lossless HO", that is, lossless, in sequence without duplication to upper layers, should be supported in specification for intra-NR.

FFS whether we support QoS flow remapping at handover and, if supported, whether the handover is lossless for this case.

RAN2-97bis Spokane (April 2017)
Agreements
1 NR/NR DC should support that different QoS flows of the same PDU session can be mapped to MgNB and SgNB.
2 In the case of NR/NR DC where different QoS flows of the same PDU session are mapped to MgNB and SgNB then there is one SDAP entity in the MgNB and one in SgNB for that PDU session.
RAN2 understand that support of this behaviour is still under discussion on SA2
Agreements:
New AS layer PDU is PDCP SDU
AS layer header is byte-aligned
DL packets over Uu are not marked with "Flow ID" at least for cases where UL AS reflective mapping and NAS reflective QoS is not configured for DRB.
AS layer header include the UL "Flow ID" depending on network configuration 3GPP R2-1707161 discussed QoS flow remapping within the same Cell and in handover as follows:

2.1 Updating QoS-Flow to DRB Filters

At RAN2-96 it was discussed how the network can change a mapping of UL flows to DRBs and RAN2 agreed that "The UE "continuously" monitors the QoS Flow ID in downlink PDCP packets and updates the reflective QoS Flow ID to DRB mapping in the uplink accordingly".

The word "continuously" was put in quotation marks since companies wanted to study whether really each and every DL packet needs to be analysed.

We believe that this is the simplest way to allow the eNB to update the mapping by redirecting the packets of a DL flow onto a different DRB. For example, if the UE observes initially a downlink packet with Flow ID X on DRB 1, it creates an "Flow-to-DRB" filter that maps uplink packets with Flow ID X to DRB 1. But if the UE later observes a downlink packet with Flow ID X on DRB 2, it should change the filter for Flow X so that also the UL packets are mapped to DRB 2.

In the meantime, SA2 agreed however that the CN should indicate dynamically in the N3 (user plane) packet header that the UE shall use this packet's headers to create or update the NAS level reflective QoS mapping:

TABLE 1

3GPP TS23.501 System Architecture for 5G System, Stage2, V0.3.1 (2017-03)

5.7.5.4.2 Reflective QoS Activation via User Plane
When the 5GC determines to activate reflective QoS via U-plane, the SMF shall include a QoS rule including an indication to the UPF to activate User Plane with user plane reflective. When the UPF receives a DL packet matching the QoS rule that contains an indication to activate reflective QoS, the UPF shall include the RQI in the encapsulation header on N3 reference point. The UE creates a UE derived QoS rule when the UE receives a DL packet with a RQI (Reflective QoS Indication).

Based on the input from SA2 that UEs shall be told whether a DL packet requires an update of the NAS level SDF-to-Flow mapping, we suggest copying that indication into the SDAP header.

Proposal 5 If the NAS-RQI bit in a DL SDAP header is set to 1, the UE indicates to NAS that it shall determine and possibly update the SDF-to-Flow mapping based on the Flow-ID present in the SDAP header.

So far RAN2 assumed that the UE shall update the AS-level Flow-to-DRB mapping based on all received DL packets containing a Flow-ID. One could consider changing this so that the UE updates also the AS-level mapping only if explicitly told to do so. To achieve this, the SDAP header would however need to comprise a second bit which indicates separately but in a similar way whether the UE shall update the Flow-to-DRB mapping using the Flow-ID in the packet header. Obviously this would only leave 6 bit for the Flow ID and hence likely lead to 2 octet SDAP headers if 6 bit is considered too small. More discussion on the possible header formats can be found in 0. In that paper we conclude that the Flow-ID in the SDAP header should 7 bit.

Proposal 6 The Flow ID length for DL and UL in SDAP header is 7-bits.
Proposal 7 Since the NAS-RQI bit is only needed in DL SDAP headers, the UL SDAP header has one spare bit (R).

2.2 Packet Reordering Upon Re-Mapping QoS Flow to Another DRB

Some companies observed in the last meeting that the re-mapping of a QoS Flow to a different DRB may cause out-of-sequence packet delivery. This may happen when initial packets of the flow ended up in a low priority DRB and subsequent packets are mapped to a high priority DRB due to an updated Flow-to-DRB mapping. We agree with this observation but believe that the network can avoid this when performing the re-mapping at an occasion where the queues are empty. It may however not always be possible to ensure this for the uplink direction. But at least for initial re-mapping from a default DRB to another DRB, it is likely that higher layers are still in the initial handshaking phase (e.g. TCP SYN/SYN-ACK, TLS security setup, HTTP GET) and hence there will typically be very few packets in flight that could overtake each other.

Observation 2 When the NW re-maps a flow to a different DRB during the initial transaction phase of the flow, packet re-ordering is unlikely due to few packets being in flight.

Observation 3 When the NW re-maps a flow to a different DRB it can minimize the risk of re-ordering by postponing it to occasions when buffers are empty or at least small.

It was also mentioned that packet re-ordering upon Flow re-mapping could be avoided by means of an additional re-ordering function per QoS Flow (above PDCP). However, in accordance with the observations above, we don't see a need for such (complex) functionality on the UE side.

If RAN2 believes the risk of packet re-ordering upon QoS-Flow remapping (in uplink direction) is unacceptably large, we suggest seeking for a relatively simple solution such as the following: Upon detecting a remapping of a flow to a different DRB (reflectively or explicitly) the PDCP transmitter copies all the not-yet-RLC-ACKed PDCP PDUs to the target DRB's PDCP entity. This may result in some duplicates but those don't matter for higher layers. Since we anyway assume that there will usually be only few packets in flight during the initial phase of a file transfer, the inefficiency due to the (few) duplicates would be negligible for the initial reflective QoS remapping described above. Of course, the approach would also avoid re-ordering on IP level if the network re-maps a flow during handover.

Moving (instead of copying) the data to another DRB would avoid the overhead but would require re-processing already pre-processed the PDCP PDUs of the source DRB.

Proposal 8 Additional UE functionality for avoiding possible out-of-order delivery when re-mapping a QoS-Flow to a different DRB (by explicit signalling or by update reflective QoS mapping) should not be introduced.

Proposal 9 If Proposal 8 is not agreeable (i.e., if RAN2 believes that re-ordering due to QoS flow re-mapping shall be avoided), the PDCP transmitter shall copy all the not-yet-RLC-ACKed PDCP PDUs to the target DRB's PDCP entity.

2.3 Precedence Order of Reflective and Configured Mapping

RAN2-96 did not yet agree on "The precedence of the RRC configured mapping and reflective QoS". There are basically three options:

1) An RRC configured mapping overrides any reflective mapping for that flow.

2) A newly derived reflective mapping overrides a mapping configured previously by RRC.

3) The UE applies always the most recent mapping, i.e., either provided by RRC or derived by reflective QoS We think that the second option would introduce an undesirable dependency between the RRC configuration and the user plane. For example, the RRC configuration (AS-Config) would not represent the mapping that the UE applies. This would be undesirable in case of mobility since the UE would not behave as expected by the target node. It would also remove the possibility to override a previous reflective QoS mapping by a dedicated configuration.

The third option suffers from possible race conditions since it may not be fully predictable whether the UE received a DL data packet or the RRCConnectionReconfiguration first. Also, just as the second option, ambiguities exist upon mobility.

Generally, we think that RRC signalling should always have precedence over L2 and L1 control signalling. It would ensure a clean split and avoid any ambiguity. Also during mobility this principle ensures that the target eNB is aware of all configured UL QoS mappings applied by the UE. Besides that, it would also allow the eNB to map a DL QoS flow onto a different DRB than the UL QoS flow with the same ID.

Proposal 10 If the eNB configures the UE with an "uplink QoS Flow to DRB filter", it overrides any reflective mapping for this QoS flow.

2.4 Maintaining QoS Mapping During Handover

In the context of inter-cell mobility, it should be discussed whether the UE maintains the reflective UL QoS filters. As mentioned above, the target eNB does not know the UE's reflective QoS filters from the AS-Config. One could consider that the source eNB provides the reflective UL QoS mappings to the target eNB (e.g. in AS-Context). Alternatively, the target node can change the QoS mapping and send the new mapping to the UE in the HO command (RRCConnectionReconfiguration). But we consider this being unnecessarily complex and it would also introduce risk of state mismatch. It appears simpler that the UE maintains a reflective UL QoS mapping as long as the DRB with which it is associated exists, i.e., also during normal RRC mobility. The UE releases the reflective UL QoS mapping when the eNB releases the DRB with which the mapping is associated.

Proposal 11 The UE maintains a reflective UL QoS mapping as long as the DRB with which it is associated exists, i.e., also during normal RRC mobility and upon bearer-type change. The UE releases the reflective UL QoS mapping when the eNB releases the DRB with which the mapping is associated.

RAN2#98 Chairman's note captured the following agreements made for related QoS:

Agreements

1: From RAN2 perspective the existing QoS parameters, and in particular the concept of QCI/5QI to abstract QoS requirements between CN and RAN should be maintained in NR/NGC.

2 RAN2 sees a benefit in providing a "averaging window" as new QoS parameter via N2. The RAN may use in this parameter in its scheduling decision e.g. to enforce MBR and GRB.

3: No additional parameters are recommendation to SA2.

4 RAN2 to ask SA2 to clarify the use and corresponding actions from CN related to the notification control to CN, if the QoS targets cannot be fulfilled in RAN Agreements of SDAP headers 1. The QoS flow ID is presence once the AS reflective QoS is active. FFS whether it is always present.

2. gNB should be informed when NAS layer reflective QoS is activated (e.g. can be used). It is FFS how we handle NAS reflective QoS and dependent on how/when it will be provided.

3. RAN2 will support a mode in which SDAP header is not present and is configured per DRB. If configured, FFS how the different fields are handled.

RAN2 NR Ad Hoc #2 Chairman's note captured the following agreements made for related QoS:

Agreements

1 At SN addition and at new PDU session establishment then MN makes the decision which QoS flows are moved SN FFS Whether the SN can reject the movement of a QoS flow.

2 Irrespective of which node makes the decision of where a QoS flow is mapped (to MN or SN) then RAN2 will aim that the RRC signalling is the same.

Agreements

1: The MN makes the decision to move ongoing/existing QoS flows to the SN (this agreement does not imply whether the QoS flow is moved by moving a single flow or by moving a whole bearer)

FFS Whether MN or SN takes the decision for flows being moved from SN to MN

2: The SN can reject the addition of a QoS flow, and inform the MN.

3: The DRB level offloading (i.e. offloading all QoS flows of a DRB) is supported between the MN and SN.

FFS: The QoS flow level offloading between the MN and SN, and if supported then whether lossless handover can be supported.

4: The lossless handover user plane procedure could be reused for DRB level offloading, if mapping is maintained in the target node.

FFS: If the case where mapping is not maintained can support lossless handover

5: The SN is responsible for the DRB management (e.g., setup, modify, release) of SCG/SCG-split bearers, and the QoS flow→DRB mapping at the SN Agreements:

1. There is a need to tell the UE that it has to update the mapping rule. For the AS reflective QoS it is up to the RAN to decide when to update the mapping rules. FFS on the details of the header format.

2. It is up to the RAN to decide when and which mechanism, explicit RRC reconfiguration and/or AS reflective QoS, should be used to provide mapping information to the UE.

3. A UE follows the latest QoS flow to DRB mapping information regardless of the fact whether it was explicit RRC or AS reflective QoS.
4. Whether a SDAP header is present or not is configured by RRC per DRB
5. The gNB indicates to UE using RRC signaling the default DRB for a PDU session.
6. RAN decides and configures the default DRB for a PDU session.

Draft 3GPP TS 37.324 specified SDAP data transfer procedure and QoS flow to DRB (Data Radio Bearer) mapping as follows:

5.2 SDAP Data Transfer Procedures
5.2.1 UL Data Transfer Procedures
At reception of an SDAP SDU from upper layer for a QoS flow,
  if there is no stored QoS flow to DRB mapping rule for the QoS flow:
    the SDAP entity shall map the SDAP SDU to the default bearer;
  else:
    the SDAP entity shall map the SDAP SDU to the DRB according to the stored QoS flow to DRB mapping rule;
  if the DRB to which this SDAP SDU is mapped is configured by upper layer [3] with the presence of SDAP header,
    the SDAP entity shall construct the SDAP PDU as specified in the subclause 6.2.2.2;
  else:
    the SDAP entity shall construct the SDAP PDU as specified in the subclause 6.2.2.1;
  the SDAP entity shall deliver the SDAP PDU to the lower layers.
5.2.2 DL Data Transfer Procedures
At reception of an SDAP PDU from lower layers,
  if the DRB from which this SDAP PDU is received is configured by upper layer [3] with the presence of SDAP header, the SDAP entity shall:
  perform reflective QoS flow to DRB mapping as specified in the subclause 5.3.2;
  retrieves the SDAP SDU from the SDAP PDU as specified in the subclause 6.2.2.2;
  else:
    retrieve the SDAP SDU from the SDAP PDU as specified in the subclause 6.2.2.1;
    deliver the retrieved SDAP SDU to the upper layer.
5.3 QoS Flow to DRB Mapping Procedure
5.3.1 QoS Flow to DRB Mapping Configuration
When upper layer [3] configures a UL QoS flow to DRB mapping rule for an SDAP entity:
  the SDAP entity shall store the UL QoS flow to DRB mapping rule.
5.3.2 Reflective QoS Flow to DRB Mapping
For each received DL packet of the QoS flow, the UE shall check the SDAP header for reflective QoS to DRB mapping, as follows:
  if reflective QoS flow to DRB mapping is enacted:
    the SDAP entity shall store the QoS flow to DRB mapping of the DL packet as the QoS flow to DRB mapping rule for the UL packets of the QoS flow.

3GPP R2-1704648 proposed to use a SDAP control PDU (Packet Data Unit) to configure QoS flow to DRB mapping as follows:

2.1 Reflective Notification on Uu
Per achievement captured in [1] (Annex A for reference), the RAN may control the uplink mapping of QoS Flow-DRB either via reflective mapping or explicit configuration. And the reflective mapping is accomplished via marking DL packets over Uu with QFI (Called as reflective mapping via SDAP data PDU hereafter).

Whether to support QoS flow-DRB remapping was raised up during SI with no final decision. The issue is analyzed in our companion contribution [2] and we propose that the QoS flow-DRB remapping for non-handover case (i.e. intra-cell remapping) should be allowed. Then according to the achievement indicated above, the RAN can control the uplink QoS flow-DRB remapping via explicit configuration or reflective mapping via SDAP data PDU. However, take the following remapping case listed in [2] for an instance:

If an incoming UL packet does not match a "QoS Flow ID to DRB mapping", the UE shall map the packet to the default DRB of the PDU session. When the gNB receives the packet, it may decide to remap the UL QoS flow to another appropriate DRB.

If the gNB controls the remapping via explicit configuration, additional RRC signalling overhead and extra delay will be introduced. While if the gNB controls the remapping via SDAP data PDU, it should be noted that for UL mainly traffic, maybe there's no DL data arrival right at that time. Then the control of the remapping may be delayed until the first DL packet arrival. The unpredictable delay may have negative impact on the user experience. The analysis above is also true for the other three remapping cases listed in [2].

To tackle the issue, one possible approach is to introduce a SDAP Control PDU for uplink reflective mapping (Called as SDAP Control PDU for reflective mapping hereafter). For example, if to map a QoS flow to a DRB via the SDAP control PDU, the QFI of the QoS flow should be include in the SDAP control PDU and the SDAP control PDU is delivered via the DRB to which the QoS flow is expected to be mapped to.

The SDAP control PDU for reflective mapping can be introduced in addition to the reflective mapping via SDAP data PDU: When the gNB decides to control the uplink mapping/remapping of QoS Flow-DRB via reflective mapping, if there's no DL data available right at that time, control via SDAP control PDU, or else control via SDAP data PDU; or, The SDAP control PDU for reflective mapping can be introduced instead of the reflective mapping via SDAP data PDU: Whenever the gNB decides to control the uplink mapping/remapping of QoS Flow-DRB via reflective mapping, control via SDAP control PDU.

During the study in SI, majority of the companies propose to decouple the NAS reflective QoS and AS reflective mapping. The target can be achieved with the introduction of SDAP control PDU replace reflective mapping via SDAP data PDU. And if it is agreed to introduce the SDAP control PDU for reflective mapping, the SDAP control PDU format can be found in our companion contribution [6].

Observation1. If with the introduction of SDAP control PDU to replace reflective mapping via SDAP data PDU, the target of decouple the NAS reflective QoS and AS reflective mapping can be achieved.

With the above analyse, we propose:
Proposal1. To introduce SDAP control PDU for reflective mapping.
Proposal2. The SDAP control PDU can be introduced either to replace or in addition to the reflective mapping via SDAP data PDU.

At RAN2#97bis [3], it's agreed that:
DL packets over Uu are not marked with "Flow ID" at least for cases where UL AS reflective mapping and NAS reflective QoS is not configured for DRB.

Then the question is when should the DL packets over Uu are marked with "Flow ID"?

According to the achievement in SA2 [4] (Annex B for reference), if the NAS reflective QoS is used, the UE needs to rely on the DL packets to derive the QoS rules. The derived QoS rule includes Packet Filter, QFI, precedence value. Among the derived QoS rules, the Packet Filter and QFI can be derived only from the DL packets. So obviously, the QFI should also be included in DL packets for the purpose of NAS reflective QoS.

Observation2. DL packets over Uu should be marked with QFI for the purpose of NAS reflective QoS.

The NAS reflective QoS is to create a QoS rule for an uplink QoS flow in the UE. And per achievement in [1], the timing of establishing non-default DRB(s) and how to map QoS flows to DRBs is up to RAN decision. At the time to create a QoS rule for an uplink QoS flow via NAS reflective QoS, it's the most probably that there will be upcoming uplink packets for this specific QoS flow. If the QoS flow is not mapped to any DRB at that time, the AS reflective mapping may be used at the same time to map this specific uplink QoS flow to an established DRB. In this case, if keeping using SDAP data PDU for the purpose of AS reflective mapping, QFI should be included in DL packets for both the purpose of NAS reflective QoS and AS reflective mapping.

Observation3. NAS reflective QoS and AS reflective mapping may take place simultaneously over the Uu.

Observation4. If keep using the SDAP data PDU for the purpose of AS reflective QoS, DL packets over Uu should be marked with QFI for the purpose of NAS reflective QoS and/or AS reflective mapping.

With the introduction of QFI in DL packets for the purpose of reflective, whether the UE should "continuously" monitor the QFI in DL packets or not is left open at the end of SI phase. Considering the high data volume in NR, concerns arise that high processing overhead as well as complexity will be introduced if the UE is required to continuously monitor QoS flow ID in each DL packet [5]. Besides, as analyzed above, if keep using the SDAP data PDU for the purpose of AS reflective QoS, the QFI should be included in the DL packets for the purpose of NAS reflective QoS and AS reflective mapping. Then if with only QFI in the DL packets, the UE receives a DL packet with QFI can't discriminate whether it is for NAS reflective QoS or AS reflective mapping, thus should perform both type of reflective checking anytime. In this way, unnecessary processing overhead will be introduced.

To tackle the issues above, indicators should be introduced in the DL packets to inform UE whether the QFI is included in the DL packets or not and whether it is for NAS reflective QoS and/or AS reflective mapping. The UE needs to do reflective checking only if it is indicated that the QFI is included. And the UE performs NAS reflective checking and/or AS reflective checking according to the instruction of the indicators. The detail of the inclusion of the indicators in the SDAP header will be discussed in our companion contribution [6].

Proposal 3. If keep using the SDAP data PDU for the purpose of AS reflective QoS, indicators should be introduced in the DL packets to inform whether QFI is included or not and whether it is for NAS reflective QoS and/or AS reflective mapping.

For the AS reflective mapping, the QoS flow-DRB mapping is determined by the gNB itself, it is up to gNB to determine when to make use of the AS reflective mapping. So the gNB knows well when the AS reflective mapping is required and generates the SDAP control PDU or SDAP data PDU for reflective mapping accordingly.

While for NAS reflective QoS, per achievement in SA2 [4], the reflective QoS can be activated via either User Plane or Control Plane via the Reflective QoS Indication (RQI). If activated via User Plane, the RQI will be included in the encapsulation header of the DL packets on N3 reference point. With the receiving of RQI, the gNB knows NAS reflective QoS is required and includes QFI in the DL packets accordingly. If activated via Control Plane, the RQI is only indicated to the UE via N1 reference point [4]. The gNB has no idea of when to include the QFI in the DL packets. So SA2 should be informed that for the case of reflective QoS activated via Control Plane, the RQI should also be informed to the gNB, e.g. via N2 signalling.

Proposal 4. To inform SA2 that the RQI should be informed to the gNB also in case the reflective QoS is activated via Control Plane.

2.2 Precedence of the RRC Configured Mapping and Reflective Mapping

The precedence of the RRC configured mapping and AS reflective mapping is still left open now [1]. During the discussion in SI, solution for the issue is discussed but without any considering on the occurring of the issue itself, that is, in which scenarios the issue will take place. The reasonable assumption is that once the QoS flow-DRB mapping is decided in the gNB, it will be kept in use only if QoS flow-DRB remapping is needed. In other words, the issue of the precedence of RRC configured and reflective mapping should only be considered if QoS flow-DRB remapping is allowed.

Proposal 5. The issue of the precedence of RRC configured and reflective mapping should only be considered if QoS flow-DRB remapping is allowed.

The gNB decides the QoS flow-DRB mapping according to the QoS profiles per QoS flow, taking the radio condition in RAN (e.g. radio link quality, load condition etc) into consideration. Neither the QoS profiles nor the radio conditions in RAN will change frequently. So it can be precluded that another QoS flow-DRB remapping will take place right after the preceding one. In other words, practically, the gNB will initiate a new remapping only after the completion of the previous remapping. And the gNB knows the most updated QoS flow-DRB mapping in UE clearly. Given the above, we propose that the UE should always apply the most recent mapping, i.e., either explicit provided by RRC or derived by reflective mapping.

Proposal 6. The UE should always apply the most recent mapping, i.e., either explicit provided by RRC or derived by reflective mapping.

2.3 QoS Flow-DRB Mapping Handle During Handover

According to the agreement at RAN2#97bis, "Lossless HO" can be accomplished if the target uses the same DRB configuration and QoS flow-DRB mapping as the source. So for the purpose of "Lossless HO", all of the QoS flow-DRB mapping information in the source should be forwarded to the target. And the UE should maintain all of the QoS flow-DRB mapping acquired from the source (including both the mapping configured via RRC signaling and the reflective mapping) during handover and update according to the target decision correspondingly.

Proposal 7. Forward all of the QoS flow-DRB mapping information from the source to the target.

Proposal 8. The UE should maintain all of the QoS flow-DRB mapping acquired from the source during handover and update according to the target decision correspondingly.

According to 3GPP TS 23.501, QoS flow is generally the finest granularity of QoS differentiation in PDU session. The PDU session provides association between a UE and a data network that provides a PDU connectivity service.

According to 3GPP TS 38.300, a new AS (Access Stratum) layer, called SDAP (Service Data Adaptation Protocol), is specified to provide functions e.g. mapping between a QoS flow and a data radio bearer (DRB) and marking QoS flow ID (QFI) in both DL packets and UL packets. In addition, each SDAP entity is associated with one PDU session. There is at least one DRB (e.g. default DRB) for each PDU session. Each SDAP PDU may contain at least a IP packet. Each SDAP PDU may contain a SDAP header (if configured for UL and/or DL). The SDAP header may indicate at least a QFI used to identify a QoS flow for which the IP packet comes from the QoS flow. A SDAP PDU could be a PDCP SDU. In addition, the network may control the mapping of QoS flow(s) to DRB in RRC explicit mapping or reflective mapping.

In general, it is assumed that each QoS flow may be configured to use a DRB via RRC (Radio Resource Control) explicit mapping or reflective mapping. If a DRB (e.g. default DRB or non-default/dedicated DRB) serves only one UL QoS flow, the network may not configure the DRB with presence of SDAP header for UL, which reduces signaling overhead and saves radio resources.

FIG. 6, which is a reproduction of FIG. A.6-1 of 3GPP TS 38.300 v0.4.1, illustrates a scenario of UE initiated UL QoS flow. The UE initiates a new UL QoS flow (the second UL QoS flow) e.g. based on pre-configured QoS parameters. If there is no mapping of the QFI to a DRB in the AS mapping table for this PDU session, the second UL QoS flow will be mapped to a default DRB of the PDU session. In case there is already an ongoing UL QoS flow (the first UL QoS flow) mapped to this default DRB and the default DRB is not configured with presence of SDAP header for UL currently, the gNB would not be aware of the second UL QoS flow when receiving UL SDAP PDUs corresponding to the second UL QoS flow from the UE. In this situation, the target QoS of the second UL QoS flow would not be satisfied because gNB would not set up a new DRB for the second QoS flow or map the second QoS flow to an existing DRB according to QoS parameters of the second QoS flow. Besides, the IP packets included in those SDAP PDUs of the second UL QoS flow would not be distinguished by the core network (e.g. UPF) because the packet filter corresponds to the first UL QoS flow. As a result, the IP packets would be discarded, which causes data missing and resources waste.

Several solutions described below could be considered.

Alternative 1: UE Indicates Preference/Need for Presence of SDAP Header

Since the UE knows if a DRB is to serve multiple UL QoS flows, the UE understands if the presence of SDAP header on the DRB is needed. In case the second UL QoS flow is initiated by the UE, the UE knows that the default DRB currently configured with no presence of SDAP header will serve the existed first UL QoS flow and the second UL QoS flow. At this time, the UE could transmit a first indication to the gNB to indicate that the presence of SDAP header on the default DRB is needed. Based on the first indication, the gNB reconfigures the default DRB with presence of SDAP header. In case the second UL QoS flow is released by the UE, the UE could transmit a second indication to the gNB to indicate that the presence of SDAP header on the default DRB is not needed. Based on the second indication, the gNB reconfigures the default DRB with no presence of SDAP header. The first indication and/or the second indication could be sent via e.g. physical signaling, MAC control element, PDCP (Packet Data Convergence Protocol) signaling, RRC signaling or a SDAP signaling (e.g. SDAP control PDU). The first indication and the second indication could also indicate the preference/need of presence of SDAP header on a non-default DRB (e.g. a second DRB).

Alternative 2: UE Provides Information about Establishment or Release of a UE Initiated QoS Flow In case the UE initiates the second UL QoS flow, the UE could transmit a first assistance information to the gNB to inform that the second UL QoS flow is initiated by the UE. The UE could determine to transmit the first assistance information if it knows that the default DRB currently configured with no presence of SDAP header will serve the existed first UL QoS flow and the second UL QoS flow. In addition, the UE could determine to not transmit the first assistance information if it knows that the default DRB currently configured with presence of SDAP header. Based on the first assistance information, the gNB reconfigures the default DRB with presence of SDAP header.

In case the UE releases the second UL QoS flow, the UE could transmit a second assistance information to the gNB to inform that the second UL QoS flow is released by the UE. The UE could determine to transmit the second assistance information if it knows that the default DRB currently configured with presence of SDAP header will serve only the first UL QoS flow. In addition, the UE could determine to not transmit the second assistance information if it knows that the default DRB currently configured with presence of SDAP header is still serving multiple UL QoS flows (e.g. the first UL QoS flow and a third UL QoS flow). Based on the second assistance information, the gNB reconfigures the default DRB with no presence of SDAP header.

In the first assistance information, QoS information/rule or parameters of the second UL QoS flow could be included. In the second assistance information, an identity of the second UL QoS flow (e.g. QFI) or an index of the QoS information/rule or parameters (reported in the first assistance information) could be included. The first assistance information and/or the second assistance information could be sent via, for example, physical signaling, MAC control element, PDCP signaling, RRC signaling or a SDAP signaling.

Based on the first assistance information indicating establishment of the second UL QoS flow, the gNB may (indicate the UE to) establish a second DRB on the UE and configure the UE to use the second DRB to serve the second UL QoS flow. Based on the second assistance information indicating release of the second UL QoS flow, the gNB may (indicate the UE to) release the second DRB used to serve the second UL QoS flow on the UE.

Since the second UL QoS flow is initiated by the UE, the UE itself may release the second UL QoS flow when the second UL QoS flow is not needed. In case the default DRB becomes to serve only the first UL QoS flow, the gNB may change the default DRB from a presence of SDAP header to no presence of SDAP header (based on e.g. above alternatives). As a result, the presence of SDAP header on the default DRB would change again and again.

In general, 3GPP R2-1707160 proposes to change the presence of the SDAP header by means of a handover. In the handover, the UE shall reset MAC layer, re-establish PDCP layer and RLC layer for all RBs that are established according to the legacy LTE system, as discussed in the 3GPP email discussion [NR-AH2#08][NR UP] Running TS 37.324 attachment "Draft 37324-010-v1.doc". As a result, all buffers in MAC layer and RLC layer are flushed. Therefore, using a handover procedure to change the presence of the SDAP header on the default DRB seems to be overkill because all the PDUs stored in the buffers may need to be retransmitted, which wastes lots of radio resources.

Alternative 3: The Default DRB is Initiated with Presence of QFI in Uplink

To make sure the gNB can identify a new QoS flow initiated by a UE during an ongoing PDU session, the default DRB of the PDU session should be initiated with presence of QFI in uplink. The UE may initiate the default DRB when receiving a DRB configuration (e.g. included in a RRC message) from the gNB. The DRB configuration may include a QFI configuration indicating presence of QFI for the default DRB. It is also feasible for the gNB not to include the QFI configuration and the UE just applies presence of QFI for the default DRB. Accordingly, the gNB should also initiate the default DRB for receiving SDAP PDU(s) from the UE.

With the QFI in a SDAP PDU transmitted on the default DRB in uplink, the gNB is able to identify the new UL QoS flow so that the gNB can transmit the IP packet included in the SDAP PDU to the core network (e.g. UPF) via correct handling (e.g. a tunnel corresponding to the new UL QoS flow) and then the IP packet can pass the corresponding packet filter.

More specifically, the QFI is included in a SDAP header of a SDAP PDU transmitted via the default DRB from the UE to the gNB. The SDAP header contains at least the QFI field. If the SDAP header contains only the QFI field, the concept could be replaced as the default DRB is initiated with presence of SDAP header in uplink.

In principle, the gNB would not reconfigure no presence of QFI for the default DRB if the gNB cannot make sure no further new QoS flows will be initiated by the UE. In this situation, QFI for the default DRB is always present. Otherwise (i.e. no further new QoS flows will be initiated by the UE), the gNB may reconfigure no presence of SDAP header for the default DRB in case only one QoS flow is mapped to the default DRB.

By this way, the above introduced alternatives (e.g. Alternative 1 and Alternative 2) seem not needed in terms of protocol efforts and signaling overhead.

In addition, the core network (e.g. UPF) could initiate a third UL QoS flow associated with the PDU session on the UE. The core network (e.g. SMF) provides QoS parameters of the third UL QoS flow to the gNB. Based on the QoS parameters of the third UL QoS flow, the gNB may establish a dedicated DRB on the UE and configure the UE to use the dedicated DRB to serve the third UL QoS flow. 3GPP R2-1704648 mentions that majority of the companies propose to decouple the NAS reflective QoS and AS reflective mapping. Thus, the gNB may configure the UE to serve the third UL QoS flow using reflective mapping.

Since it is possible that no DL QoS flow corresponds to the third UL QoS flow (i.e. no DL SDAP PDU uses a QFI associated with the third UL QoS flow), the UE cannot create the reflective mapping rule for the third UL QoS flow so as to use the default DRB to serve the third UL QoS flow. In this situation, the default DRB cannot satisfy the QoS of the third UL QoS flow.

In general, 3GPP R2-1704648 proposes to use SDAP control PDU to assist the UE creating the reflective mapping rule. This solution seems feasible, but causes complexities and signaling overhead. For example, the gNB cannot know whether the UE receives a SDAP control PDU indicating the third UL QoS flow (e.g. the corresponding QFI included in the SDAP control PDU) on the dedicated DRB so that the gNB would transmit the SDAP control PDU several times till the UE transmits UL SDAP PDUs of the third UL QoS flow on the dedicated DRB.

Other solutions described below could be used instead.

Alternative 4: QoS Profile Provided to gNB Indicates Traffic Direction (e.g. Only UL, Only DL or Bidirectional)

When a QoS flow is initiated by the core network (e.g. SMF), the core network provides a QoS profile related to the QoS flow to the gNB. In general, the QoS profile does not consider traffic directions e.g. UL or DL if NR follows LTE concept (as discussed in 3GPP TS 23.401) that EUTRAN core network (e.g. MME) initiates an EPS (Evolved Packet System) bearer and EUTRAN base station (e.g. eNB) configures the association between the EPS bearer and a DRB. If a LTE UE has UL traffic belonging to the EPS bearer, it uses the DRB for transmission of the UL traffic. If DL traffic belonging to the EPS bearer arrives on the EUTRAN base station, the EUTRAN base station use the DRB to transmit the DL traffic to the LTE UE. In order words, in LTE, mapping of EPS bearer to DRB for UL does not depend on mapping of EPS bearer to DRB for DL. In NR, mapping of QoS flow to DRB for UL may depend on mapping of QoS flow to DRB for DL. If the mapping of QoS flow to DRB for DL is not available, the reflective mapping rule should not be used.

Therefore, the QoS profile should include information about traffic direction on each QoS flow so that the gNB can know whether mapping of the QoS flow to DRB for DL is available or not. For example, the QoS profile/parameters related to the third UL QoS flow indicates a QFI and traffic in (only) UL direction. By this way, the gNB configures the UE to use the dedicated DRB to serve the third UL QoS flow via RRC explicit mapping. If the QoS profile/parameters related to the third UL QoS flow indicates a QFI and traffic in both UL and DL direction, the gNB may configure the UE to use the dedicated DRB to serve the third UL QoS flow via reflective mapping.

Alternative 5: A QoS Flow not to be Served by Default DRB Uses RRC Explicit Mapping In general, Alternative 4 is feasible, but would cause protocol efforts on definition of traffic direction. Another solution could be that the gNB should use RRC explicit way to configure a QoS flow with the mapping of the QoS flow to a DRB if the DRB is a dedicated DRB i.e. the DRB is not a default DRB.

Since the gNB uses RRC signaling to establish a dedicated DRB to serve the third UL QoS flow, the RRC signaling can include information about the mapping of the third UL QoS flow to the dedicated DRB because the information does not cause significant signaling overhead.

If the gNB configures the QoS flow with reflective mapping and Alternative 3 is used, the gNB will be aware of the third UL QoS flow using the default DRB. And then the gNB transmits a RRC signaling indicating the mapping of the third UL QoS flow to the dedicated DRB to the UE.

Anyway, the RRC explicit way will be used for the mapping of the third UL QoS flow to the dedicated DRB. Therefore, this alternative seems simplest in terms of protocol efforts.

FIG. 12 is a flow chart 1200 according to one exemplary embodiment of a network node. In step 1205, the network node transmits a first message with a DRB configuration to a UE for establishing a default DRB for a PDU session, wherein the DRB configuration includes a QFI configuration used to indicate whether a QFI field is present or not in uplink for the default DRB and the QFI configuration is always set to a value indicating the QFI field is present in uplink for the default DRB. In one embodiment, the network node may not be allowed to transmit a second message to the UE for reconfiguring the QFI configuration for the default DRB to no presence of the QFI field.

In step 1210, the network node establishes the default DRB with a presence of the QFI field in uplink. In one embodiment, a header in the SDAP PDU could include at least the QFI field.

In step 1215, the network node receives a SDAP PDU with the QFI field via the default DRB from the UE.

In one embodiment, the network node could transmit an IP (Internet Protocol) packet included in the SDAP PDU to a core network. Furthermore, the network node could be a base station. Furthermore, the base station could be a gNB.

Referring back to FIGS. 3 and 4, in one exemplary embodiment of a network node, the device 300 includes a program code 312 stored in the memory 310. The CPU 308 could execute program code 312 to enable the network node (i) to transmit a first message with a DRB configuration to a UE for establishing a default DRB for a PDU session, wherein the DRB configuration includes a QFI configuration used to indicate whether a QFI field is present or not in uplink for the default DRB and the QFI configuration is always set to a value indicating the QFI field is present in uplink for the default DRB, (ii) to establish the default DRB with a presence of the QFI field in uplink, and (iii) to receive a SDAP PDU with the QFI field via the default DRB from the UE. Furthermore, the CPU 308 can execute the program code 312 to perform all of the above-described actions and steps or others described herein.

Figure 13:
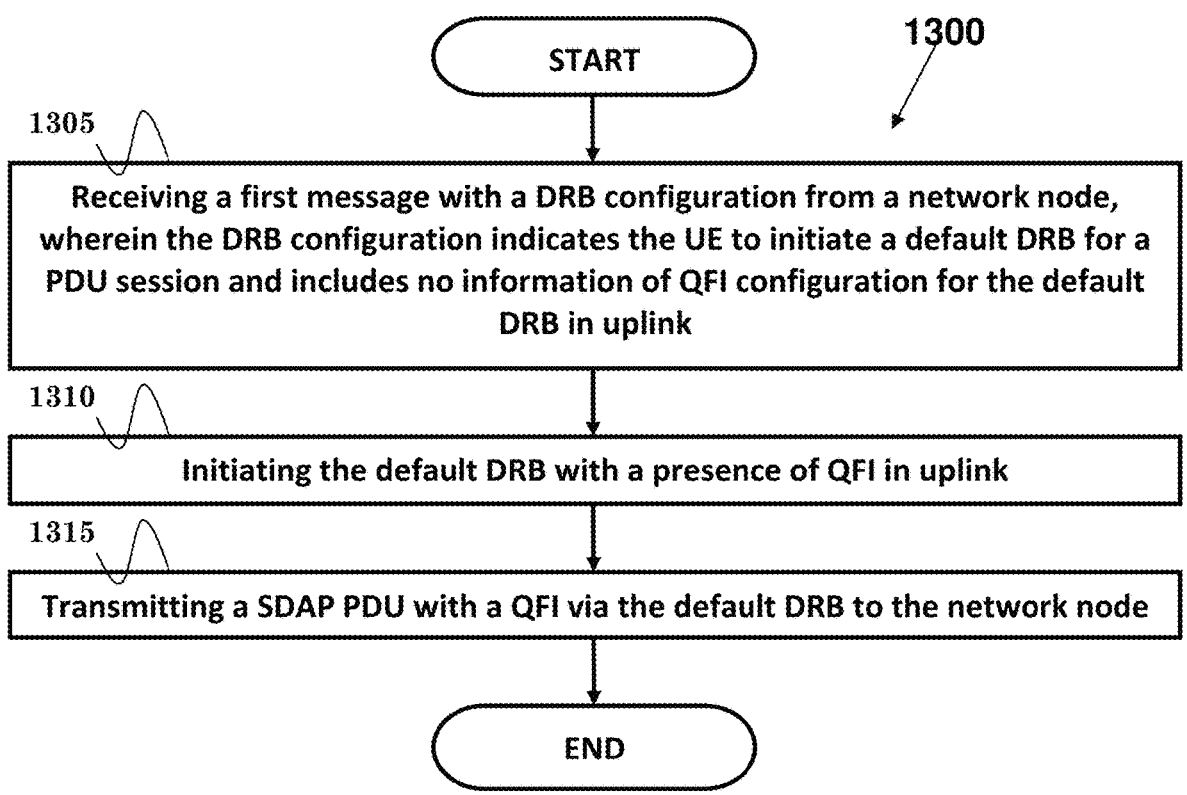
FIG. 13 is a flow chart according to one exemplary embodiment.

FIG. 13 is a flow chart 1300 according to one exemplary embodiment of a UE. In step 1305, the UE receives a first message with a DRB configuration from a network node, wherein the DRB configuration indicates the UE to initiate a default DRB for a PDU session and includes no information of QFI configuration for the default DRB in uplink. In one embodiment, wherein the UE may not receive a second message from the network node for changing the QFI configuration for the default DRB to no presence of QFI (i.e. QFI for the default DRB is always present).

In step 1310, the UE initiates the default DRB with a presence of QFI in uplink. In step 1315, the UE transmits a SDAP PDU with a QFI via the default DRB to the network node. In one embodiment, a header in the SDAP PDU could include at least a field of QFI. Furthermore, an IP packet could be included in the SDAP PDU for transmitting to a core network. The core network could a UPF (User Plane Function) or a SMF (Session Management Function), as discussed in 3GPP TS 23.501. The network node could be a base station (e.g. gNB).

Referring back to FIGS. 3 and 4, in one exemplary embodiment of a UE, the device 300 includes a program code 312 stored in the memory 310. The CPU 308 could execute program code 312 to enable the UE (i) to receive a first message with a DRB configuration from a network node, wherein the DRB configuration indicates the UE to initiate a default DRB for a PDU session and includes no information of QFI configuration for the default DRB in uplink, (ii) to initiate the default DRB with a presence of QFI in uplink, and (iii) to transmits a SDAP PDU with a QFI via the default DRB to the network node. Furthermore, the CPU 308 can execute the program code 312 to perform all of the above-described actions and steps or others described herein.

Figure 14:
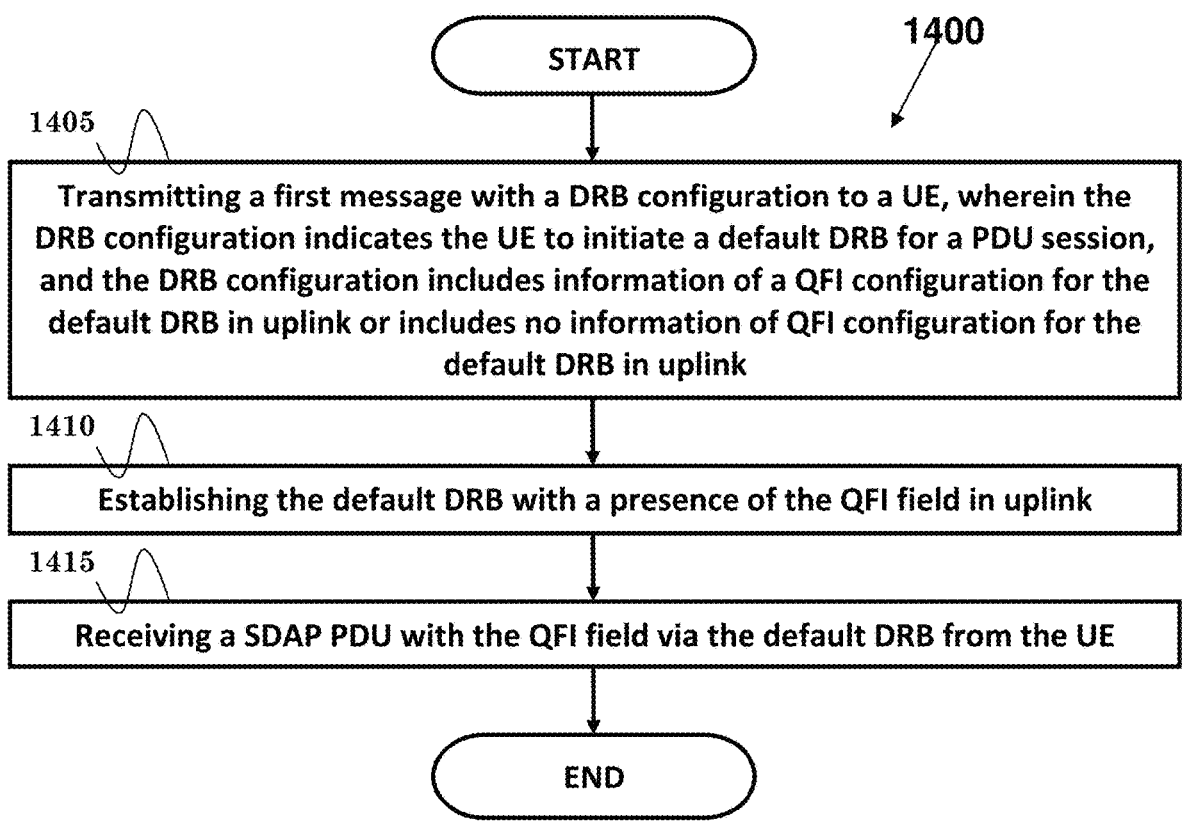
FIG. 14 is a flow chart according to one exemplary embodiment.

FIG. 14 is a flow chart 1400 according to one exemplary embodiment of a network node. In step 1405, the network transmits a first message with a DRB configuration to a UE, wherein the DRB configuration indicates the UE to initiate a default DRB for a PDU session, and the DRB configuration includes information of a QFI configuration for the default DRB in uplink or includes no information of QFI configuration for the default DRB in uplink.

In one embodiment, the network node may not transmit a second message to the UE for changing the QFI configuration for the default DRB to no presence of QFI (i.e. QFI for the default DRB is always present). In addition, the network node may not set the QFI configuration for the default DRB in uplink to no presence of QFI in uplink.

In step 1410, the network node initiates the default DRB with a presence of QFI in uplink.

In step 1415, the network node receives a SDAP PDU with a QFI via the default DRB from the UE. In one embodiment, a header in the SDAP PDU could include at least a field of QFI.

In one embodiment, the network node could transmit an IP packet included in the SDAP PDU to a core network. The network node could be a base station (e.g. gNB). The core network could be a UPF or a SMF, as discussed in 3GPP TS 23.501.

Referring back to FIGS. 3 and 4, in one exemplary embodiment of a network node, the device 300 includes a program code 312 stored in the memory 310. The CPU 308 could execute program code 312 to enable the network node (i) to transmit a first message with a DRB configuration to a UE, wherein the DRB configuration indicates the UE to initiate a default DRB for a PDU session, and the DRB configuration includes information of a QFI configuration for the default DRB in uplink or includes no information of QFI configuration for the default DRB in uplink, (ii) to initiate the default DRB with a presence of QFI in uplink, and (iii) to receives a SDAP PDU with a QFI via the default DRB from the UE. Furthermore, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a network node, comprising:
transmitting a first RRC (Radio Resource Control) message with a DRB (Data Radio Bearer) configuration to a UE (User Equipment) for establishing a default DRB for a PDU (Protocol Data Unit) session, wherein the DRB configuration includes a QFI (QoS Flow Id) configuration used to indicate whether a QFI field is present or not in uplink for the default DRB and the QFI configuration is always set to a value indicating the QFI field is present in uplink for the default DRB;
establishing the default DRB with a presence of the QFI field in uplink; and
receiving a SDAP (Service Data Adaptation Protocol) PDU with the QFI field via the default DRB from the UE.

2. The method of claim 1, wherein the network node is not allowed to transmit a second RRC message to the UE for reconfiguring the QFI configuration for the default DRB to no presence of the QFI field.

3. The method of claim 1, wherein a header in the SDAP PDU includes at least the QFI field.

4. The method of claim 1, wherein the network node transmits an IP (Internet Protocol) packet included in the SDAP PDU to a core network.

5. The method of claim 1, wherein the network node is a base station (or gNB).

6. A network node, comprising:
a control circuit;
a processor installed in the control circuit; and
a memory installed in the control circuit and operatively coupled to the processor;
wherein the processor is configured to execute a program code stored in the memory to:
transmit a first RRC (Radio Resource Control) message with a DRB (Data Radio Bearer) configuration to a UE (User Equipment) for establishing a default DRB for a PDU (Protocol Data Unit) session, wherein the DRB configuration includes a QFI (QoS Flow Id) configuration used to indicate whether a QFI field is present or not in uplink for the default DRB and the QFI configuration is always set to a value indicating the QFI field is present in uplink for the default DRB;

establish the default DRB with a presence of the QFI field in uplink; and receive a SDAP (Service Data Adaptation Protocol) PDU with the QFI field via the default DRB from the UE.

7. The network node of claim 6, wherein the network node is not allowed to transmit a second RRC message to the UE for reconfiguring the QFI configuration for the default DRB to no presence of the QFI field.

8. The network node of claim 6, wherein a header in the SDAP PDU includes at least the QFI field.

9. The network node of claim 6, wherein the network node transmits an IP (Internet Protocol) packet included in the SDAP PDU to a core network.

10. The network node of claim 6, wherein the network node is a base station (or gNB).

* * * * *